United States Patent [19]

Kirsch

[11] Patent Number: 5,460,049
[45] Date of Patent: Oct. 24, 1995

[54] DIGITALLY-TEMPERATURE-COMPENSATED STRAIN-GAUGE PRESSURE MEASURING APPARATUS

[75] Inventor: Michael S. Kirsch, Spokane, Wash.

[73] Assignee: Instrumention Northwest, Inc., Redmond, Wash.

[21] Appl. No.: 187,433

[22] Filed: Jan. 26, 1994

[51] Int. Cl.$^6$ .............................. G01L 9/06; G01L 19/04
[52] U.S. Cl. .................... 73/708; 73/727; 73/152
[58] Field of Search ........................ 73/708, 719, 720, 73/721, 725, 726, 727, 152

[56] References Cited

U.S. PATENT DOCUMENTS

| 4,366,714 | 1/1983 | Adorni | 73/708 |
| 5,228,337 | 7/1993 | Sharpe et al. | 73/708 X |

FOREIGN PATENT DOCUMENTS

| 2201791 | 9/1988 | United Kingdom | 73/708 |

OTHER PUBLICATIONS

HydroNet Series H-300 Waterlog Pressure Transducer (brochure), Aug. 1990.

*Primary Examiner*—Richard Chilcot
*Assistant Examiner*—Joseph L. Felber
*Attorney, Agent, or Firm*—Steven P. Koda

[57] ABSTRACT

A strain gauge exhibits temperature offset errors and span errors which vary from device to device and vary as a function of temperature. A digitally-compensated strain-gauge apparatus executes embedded calibration and compensation programs for improving accuracy over a wide temperature range. Pressure measurement error bands are reduced to approximately to 0.03% of full scale for a 5 psi device over a 0° C. to 50° C. temperature range. A calibration program defines parameters for compensating for such errors. During field operation, a compensation program uses the calibration parameters to generate a more accurate pressure measurement. According to the compensation scheme, current normalized voltage and bridge impedance are derived from the raw data. A first-pass temperature estimate then is derived from the result. The derived first-pass temperature estimate is plugged into a temperature offset error function to find the temperature offset error at the estimated temperature. Such offset error is used to adjust the current normalized voltage. A first-pass pressure estimate is derived from the adjusted current-normalized voltage, then used to correct the bridge impedance. The corrected bridge impedance leads to a corrected temperature estimate, a corrected current normalized voltage and a corrected pressure. The corrected pressure is the compensated pressure measurement.

11 Claims, 6 Drawing Sheets

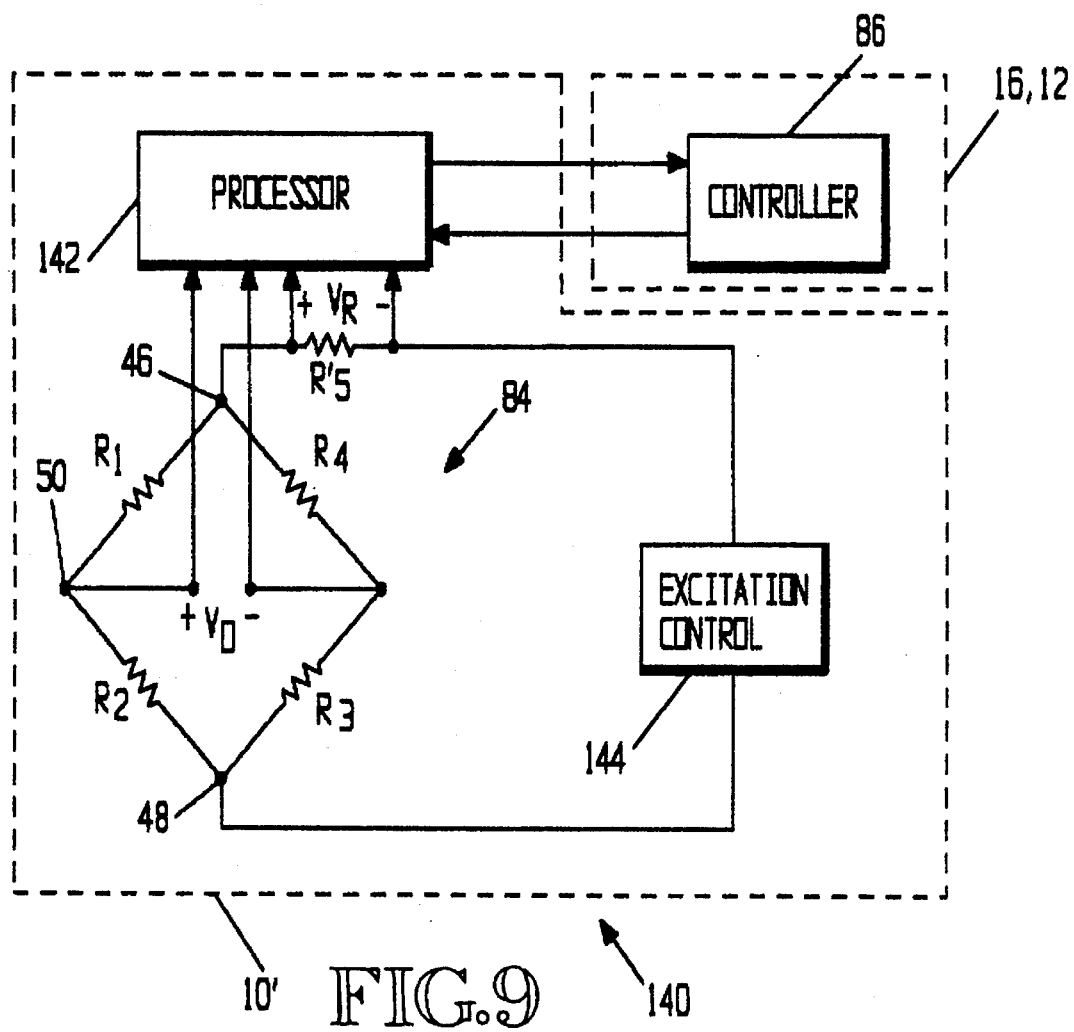
FIG. 9
FIG. 10
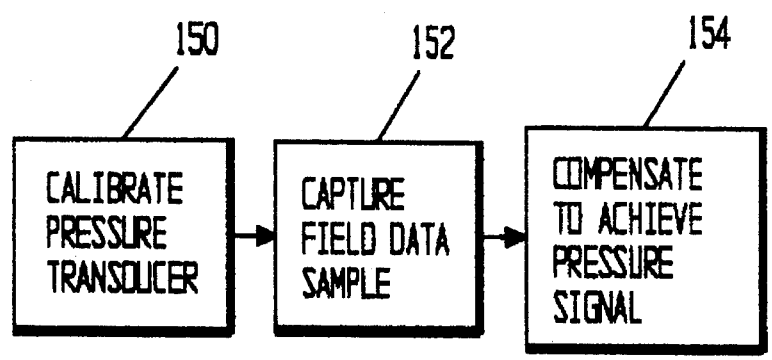

DIGITALLY-TEMPERATURE-COMPENSATED STRAIN-GAUGE PRESSURE MEASURING APPARATUS

CROSS REFERENCE TO RELATED PATENTS

This invention is related to commonly-assigned U.S. Pat. No. 5,033,297 issued Jul. 23, 1991 for a SUBMERSIBLE SENSOR. The content of that patent is incorporated herein by reference and made a part hereof.

NOTICE REGARDING COPYRIGHTED MATERIAL

A portion of the disclosure of this patent document contains material which is subject to copyright protection. The copyright owner has no objection to the facsimile reproduction by anyone of the patent document or the patent disclosure as it appears in the public Patent and Trademark Office file or records, but otherwise reserves all copyright rights whatsoever.

BACKGROUND OF THE INVENTION

This invention relates to an error-compensated pressure measuring apparatus, and more particularly to an apparatus increasing the accuracy of a strain-gauge pressure transducer by digitally compensating for temperature-induced and device-specific errors.

A conventional silicon strain gauge pressure transducer includes a thin silicon diaphragm with four implanted resistors. Pressure variations on the diaphragm strain the resistors causing their respective resistance values to change. The resistors are interconnected in a bridge configuration having input and output connections. When pressure is applied to the diaphragm, the bridge structure exhibits compression at a first two resistors and tension at the second two resistors. The compressed resistors have a decreased resistance, while the tensed resistors have an increased resistance. Variations in resistance cause variations in bridge signal characteristics.

In operation, an excitation current is applied to the bridge (diaphragm) via two input connectors. An output signal is measured at two output connectors. The output signal typically is in the millivolt range. Changes in resistance caused by changes in pressure vary the output signal. In an ideal pressure transducer, the individual resistances would change only in response to variations in pressure. However, temperature variations also alter the resistance values. Other sources of error also may effect the resistance values. In the past, one solution has been to avoid or readily compensate for temperature induced error by limiting a strain gauge's operational temperature range to a narrow field. Many applications, however, require operation over a wide temperature range.

Passive compensation schemes provide one solution for compensating for temperature in a strain gauge over a wide temperature range. According to alternate passive compensation schemes, either a constant voltage or a constant current excitation signal is applied to the bridge. For a constant current excitation signal, sensors are supplied with a compensation card including several thermally stable resistors. Resistance values are determined from test data. For a constant voltage excitation signal, a thermally stable, precision resistor is coupled in series to the bridge. Actual excitation current is then derived by measuring the voltage drop across the precision resistor. The passive compensation schemes partially corrects for temperature-induced offset errors. Using these passive compensation schemes reduces error bands to as low as 1% of full scale pressure (i.e., 1% FSO) over a 0° C. to 50° C. range. However, such accuracy still is unacceptable for many pressure measurement applications.

For applications requiring error bands less than 1% FSO, other sensor technologies have been used. For example, mercury manometers provide pressure reading error bands down to 0.1% FSO over an operating temperature range of 0° C. to 50° C. Different applications require different accuracies. One typical application of a pressure sensor is measurement of water depth. When measuring water depth in a well, the temperature is generally stable (e.g., varies by less than +/– 5° C. over the course of a year). The less accurate, less expensive conventional strain gauge is sufficiently accurate for such measurement. For example, the strain gauge can be calibrated with a zero offset to get sufficient measurement accuracies. When measuring water depth in a stream, river, lake or ocean body, however, the temperature usually varies significantly with changes in depth and over the course of a year for the interested depth range. As a result, the typical strain gauge cannot meet accuracy requirements. In such applications, the mercury manometer has been commonly used. Mercury in the waterways, however, has led to regulations limiting many sources of mercury contamination. These regulations are limiting the use of mercury manometers. Accordingly, there is a need for an environmentally safe technology which can provide accurate pressure measurements over a wide operating temperature range.

SUMMARY OF THE INVENTION

According to the invention, a digitally-compensated strain-gauge pressure measuring apparatus implements a calibration and compensation method for improving the accuracy of a strain gauge pressure sensor over a wide temperature range. Pressure measurement error bands are reduced to approximately to 0.03% of full scale for a 5 psi device over a 0° C. to 50° C. temperature range. This is a significant improvement over the typical 1% error bands achieved using a conventional passive compensation scheme alone.

It is known that a strain gauge is subject to temperature offset error and span error. It also is known that these error functions are non-linear and differ slightly from one device to the next. Passive compensation schemes partially compensate for temperature effects, but do not eliminate non-linear variations or differences occurring from one device to the next. According to the apparatus of this invention, such non-linear variations and device-specific contributions are substantially reduced to significantly increase strain gauge accuracy.

According to one aspect of the invention, errors in strain gauge pressure transducer response are compensated by calibrating the transducer before use in the field (i.e., in the factory; in the shop). During calibration, sample measurements are taken at known pressures and known temperatures. A temperature offset error function and a span error function specific to the calibrated transducer are derived. Temperature offset error is defined as a second order function of temperature. Parameters for the temperature offset error function are determined by a least squares fit of data for each known temperature, known pressure measurement sample. Span error also is defined as a second order function of temperature. Parameters for the span error function also are determined by a least squares fit of data for each known temperature, known pressure-span measurement sample. Performing a calibration for each transducer substantially eliminates device to device variation in performance and accuracy. Variations due to differences in material or performance are accounted for by variations in the derived calibration parameters.

According to another aspect of the invention, calibration parameters for making a first-pass estimate of pressure also are defined during calibration. The estimated pressure is defined as a first order function of the transducer's current normalized voltage. Data samples taken at zero-scale pressure and full-scale pressure are used to determine a multiplier parameter and an offset parameter.

According to another aspect of the invention, calibration parameters for deriving a corrected temperature and parameters for deriving a corrected pressure also are defined during calibration.

According to another aspect of this invention, a data logger executes a calibration program which defines the calibration parameters based upon a collection of data samples taken under known temperature and pressure conditions. The calibration parameters are downloaded to a processor which executes a compensation program. Such parameters are stored in memory and retrieved during processing of field data.

According to another aspect of the invention, the compensation program processes a field data sample of transducer output voltage and normalizing resistor voltage to generate a compensated pressure measurement. Current normalized voltage and bridge impedance are derived from the voltage readings. A first-pass temperature estimate then is derived from the bridge impedance by comparing the calculated bridge impedance to the mid-range temperature bridge impedance found during calibration. The bridge impedance difference is taken as being proportional to the temperature difference from mid-range temperature.

The first-pass temperature estimate is plugged into the temperature offset error function to determine a temperature offset error at the estimated temperature. Such offset error is used to adjust the current normalized voltage. A first-pass pressure estimate then is derived from the adjusted current-normalized voltage. The first-pass pressure estimate is used to refine the bridge impedance and derive a corrected bridge impedance. The corrected bridge impedance, in turn, is used to correct the temperature estimate. The corrected temperature is used to derive a corrected current normalized voltage, which in turn, is used to derive a corrected pressure estimate. The corrected pressure estimate is the compensated pressure measurement of the pressure measuring apparatus.

According to one embodiment of this invention, a pressure sensor includes a transducer and is connected to a data logger via a normalizing resistor. The logger includes a processor which executes the compensation program. During field operation, the logger captures transducer output voltage and normalizing resistor voltage to derive a compensated pressure measurement for storage, display or printout.

According to an alternative embodiment of this invention, a pressure sensor includes a processor, a pressure transducer and a normalizing resistor. The sensor's processor executes the compensation program accessing calibration parameters derived during calibration. During field operation, the sensor outputs a compensated pressure measurement to a data logger for storage, display or printout.

One advantage of the invention is that a relatively inexpensive strain gauge can be adapted to substantially reduce its error band from approximately 1% to approximately 0.03% full-scale offset error. The increased accuracy enables strain gauge technology to be used in many high-accuracy applications previously served by more expensive technologies. Another advantage is that a temperature measurement is obtained from the bridge structure without the need of additional temperature sensors, additional signal conditioning or additional calibration. The invention and its advantages will be better understood by reference to the following detailed description taken in conjunction with the accompanying drawings.

BRIEF DESCRIPTION OF THE DRAWINGS

FIG. 9 is a partial electrical-schematic diagram of an alternative embodiment of the pressure measuring apparatus of this invention; and FIG. 10 is a flow chart of the pressure measuring process as implemented for the alternative embodiment of FIG. 9.

DESCRIPTION OF SPECIFIC EMBODIMENTS

Overview

Figure 1:
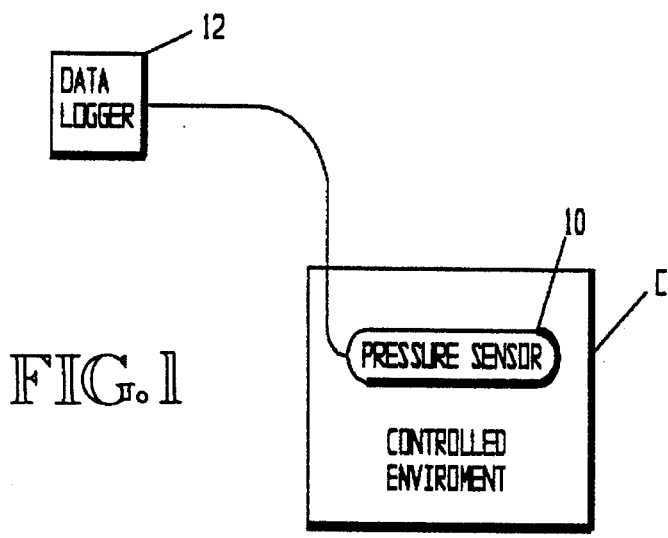
FIG. 1 is a block diagram of a pressure sensor, a data logger and a controlled environment source.

FIG. 1 shows a block diagram of a pressure measuring apparatus, including a pressure sensor 10 coupled to a data logger 12. The pressure sensor 10 includes a strain gauge pressure transducer. The transducer includes a piezoresistive diaphragm. The diaphragm includes four resistor elements connected in a bridge configuration. The bridge receives an electrical excitation signal and generates in response an electrical output signal. Each of four resistive arms vary in resistance generating an output signal which is proportional to pressure. The excitation signal is substantially constant so that variations in the output signal result from changes in bridge impedance. Ideally, each side of the bridge experiences an equal and opposite change in resistance keeping bridge resistance constant over pressure. Slight imbalances, however, lead to a small change (i.e., span error) in bridge resistance change with pressure. In addition, changes in temperature cause changes in bridge impedance. Thus, the transducer response varies (i) with temperature and (ii) over the span of the sensor.

The bridge output signal is compensated for temperature and span related errors so as to provide an accurate representation of pressure. Such compensation is derived for each specific transducer. More specifically, parameters used during compensation are defined for each specific transducer. As each transducer may have slight variations in material and performance response, custom parameters avoid device to device error sources.

There are many applications for pressure measurement methods, including water management, oceanography, environmental control, liquid level, air conditioning, medical, process control, refrigeration, food processing, fluid power and agricultural spraying. The strain gauge pressure transducer has commonly been used for applications requiring relatively low accuracy at a fixed temperature or a narrow temperature range. At a fixed or narrow temperature range, temperature offset error is represented as a constant. A simple offset adjustment precedes measurement. As the offset error varies with temperature, however, the constant is an inadequate adjustment for taking measurements over a wide temperature range. Large temperature variations also produce a slight variation (i.e., span error). Using passive compensation schemes, error bands only as low as 1% of full scale (FSO) have been achieved for a temperature range of 0° C. to 50° C. Such accuracy has been sufficient for its typical application—measuring well depth. Improved accuracy is needed for other applications, including applications for measuring water depth in streams, rivers, lakes and ocean bodies. According to this invention a dynamic compensation scheme is applied which reduces a strain gauge's error band to as low as 0.03% of full scale over the same temperature range. Errors which occur across changes in temperature, pressure and device are calibrated and compensated to achieve increased accuracy. Accordingly, an improved pressure measuring apparatus is achieved.

Figure 2:
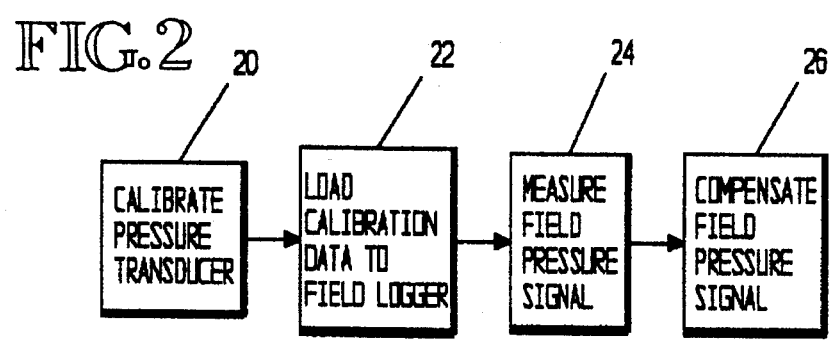
FIG. 2 is a flow chart of the pressure measurement process.

An overview of the measurement process is shown in FIG. 2. At step 20 the pressure sensor 10 is calibrated, resulting in calibration data, including a set of calibration parameters. At step 22 the calibration data is loaded into the pressure measuring apparatus 14. (See FIG. 3). At step 24 field data is captured by pressure sensor 10. At step 26 the field data is error-compensated to yield a pressure measurement having increased accuracy.

During the calibration process (step 20), sensor 10 is placed in a controlled environment C. In one embodiment, the controlled environment C is formed using an environmental chamber. A user is able to set the temperature and pressure of the chamber to known values. Sample pressure measurements are collected by data logger 12 through sensor 10 at several known environmental pressures and temperatures. For example, sample pressure measurements are collected at several known environmental pressures, while holding the environmental temperature constant. The temperature is then varied and additional samples are collected at the known pressures. The sampling procedure then is repeated for several known temperatures.

The sample pressure measurements, along with the known pressure values and known temperature values, are used to derive calibration parameters specific to the sensor 10. As individual sensor 10 specimens have slightly different material characteristics and performance responses, such calibration data is specific to the individual sensor 10 specimen calibrated. Each sensor specimen is calibrated before shipment and field use. Performance may vary slightly over time, so the sensor 10 subsequently may be re-calibrated (e.g., once every 1–5 years).

Compensation is performed by digitally processing the sensor response signal to derive a compensated pressure measurement. Such processing is implemented digitally as a computer program (referred to as a "compensation program") executed by a processor. In one embodiment, the compensation program is embedded in program memory of a field data logger 16. In another embodiment the compensation program is embedded in program memory of a pressure sensor 10' (See FIG. 9). The sensor 10' includes a microprocessor for executing the stored compensation program. The structure of such sensor 10' is described in more detail below in the section titled "Alternate Embodiments." In either embodiment, the calibration parameters are loaded (step 22) into the appropriate processor's memory for use during execution of the compensation program.

Figure 3:
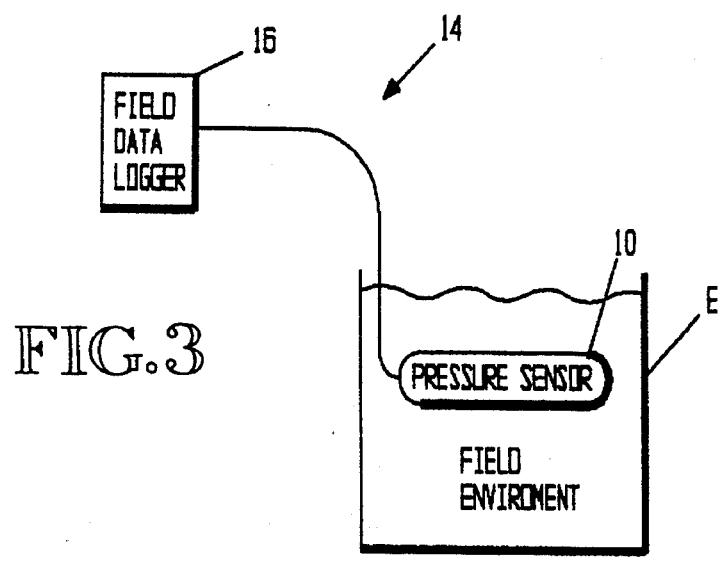
FIG. 3 is a block diagram of a pressure measuring embodiment of this invention in a field environment.

When taking field measurements, the pressure sensor 10 is connected to the field data logger 16 as shown in FIG. 3. The sensor 10 then is placed into a field environment E (i.e., stream, river, lake, ocean). Pressure samples then are taken by the sensor 10. Each sample is compensated to achieve a compensated pressure measurement.

Pressure Transducer

Figure 4:
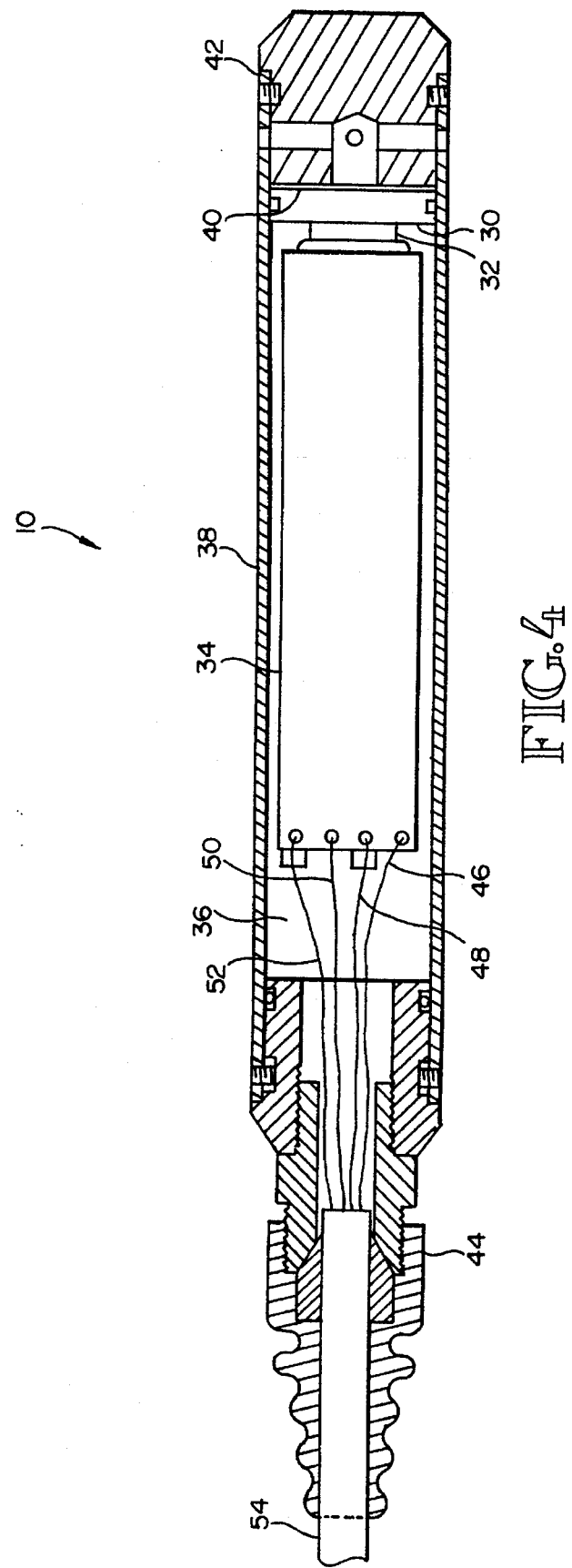
FIG. 4 is a sectional view of the pressure sensor of FIGS. 1 and 3.

FIG. 4 shows a sectional view of a pressure sensor 10 used in a pressure measurement apparatus embodiment 14 of this invention. The sensor 10 is a submersible sensor described in commonly-assigned issued U.S. Pat. No. 5,033,297, the entire contents of which are incorporated herein by reference. The sensor 10 includes a pressure transducer 30 coupled to circuit boards 32 and 34 within a central chamber 36 of cylindrical body 38. The transducer 30 includes a silicon piezoresistive diaphragm 40 responsive to changes in pressure. The central chamber is sealed with an end plug 42 at one end and an end cone assembly 44 at the other end. An excitation input signal is fed to the diaphragm 40 via input conductor wires 46, 48 and circuit boards 32 and 34. An output response signal is returned from the diaphragm 40 through circuit boards 32, 34 to output conductor wires 50, 52. During operation, the input and output wires 46–52 are coupled to a data logger 16 (FIG. 3) via cable 54.

In one embodiment the sensor 10 receives a constant voltage excitation signal from data logger 12/16. In response a millivolt output signal is generated. The output signal, $V_o$, is normalized to the excitation current, I, of the input signal using a precision resistor coupled in series to the sensor's bridge structure.

Data Logger

Figure 5:
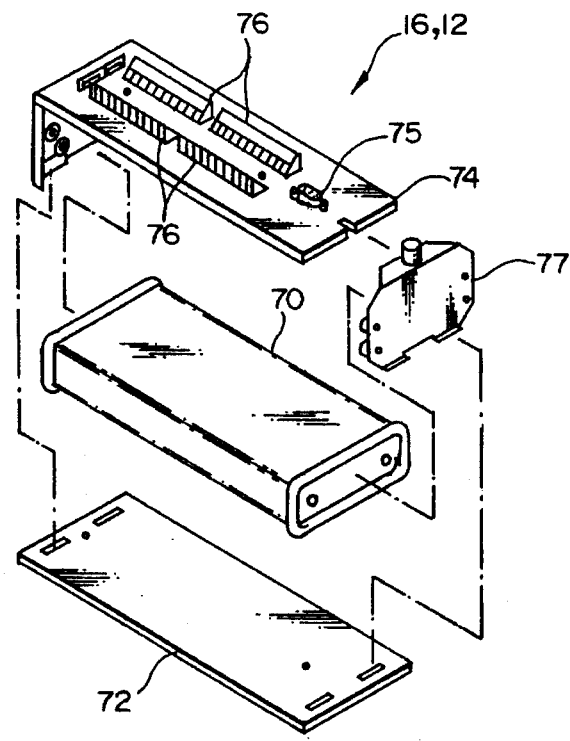
FIG. 5 is a partially exploded view of a data logger typical of the data loggers shown in FIGS. 1 and 3.

FIG. 5 shows a partially exploded view of data logger 12/16. The logger 12/16 includes internal electronics 70 mounted on a base board 72. A wiring panel 74 is connected to the internal electronics 70 and base board 72 with panel bracket 76. Logger 16 is a programmable controller which may be linked to a computer terminal and keyboard. The logger 16 includes a microprocessor and storage memory. Programming is performed through the terminal and keyboard and stored in logger memory.

The wiring panel 74 includes a 9-pin serial I/O port 75 for communicating with a computer terminal. Many wiring connectors 76 also are provided. Connectors 76 receive conductors for defining analog input signals, excitation signals, and various control and status signals. Conductors 46–52 (FIG. 4) of the sensor 10 are coupled to the wiring panel 74 via cable 54 at connectors 76. In one embodiment data loggers 12 and 16 are CR10 Measurement and Control Modules manufactured by Campbell Scientific, Inc. of Logan, Utah. In another embodiment, the data logger 12 and/or 16 is implemented in a general purpose microcomputer.

A calibration program is loaded into the memory of the logger 12, then executed to calibrate sensor 10. A compensation program is loaded into the memory of logger 16, then executed during field operation of sensor 10. Collected field data samples are stored in logger 16 and subsequently output to a printer or computer terminal for viewing, permanent storage and/or further analysis.

According to one embodiment, the data logger 12 generates a constant-voltage excitation signal which is output to the sensor. A precision resistor, $R_S$, is placed in series with the sensor. The excitation signal is applied through the series resistor to one input channel of the sensor 10. Through wiring panel 74, the logger measures the bridge output voltage, $V_O$, and the voltage drop, $V_R$, across the series resistor. The output signal is then normalized to the current of the constant voltage excitation signal to provide the current-normalized voltage signal, $L=V_O/I=V_OR/V_R$.

Electrical Diagram

Figure 6:
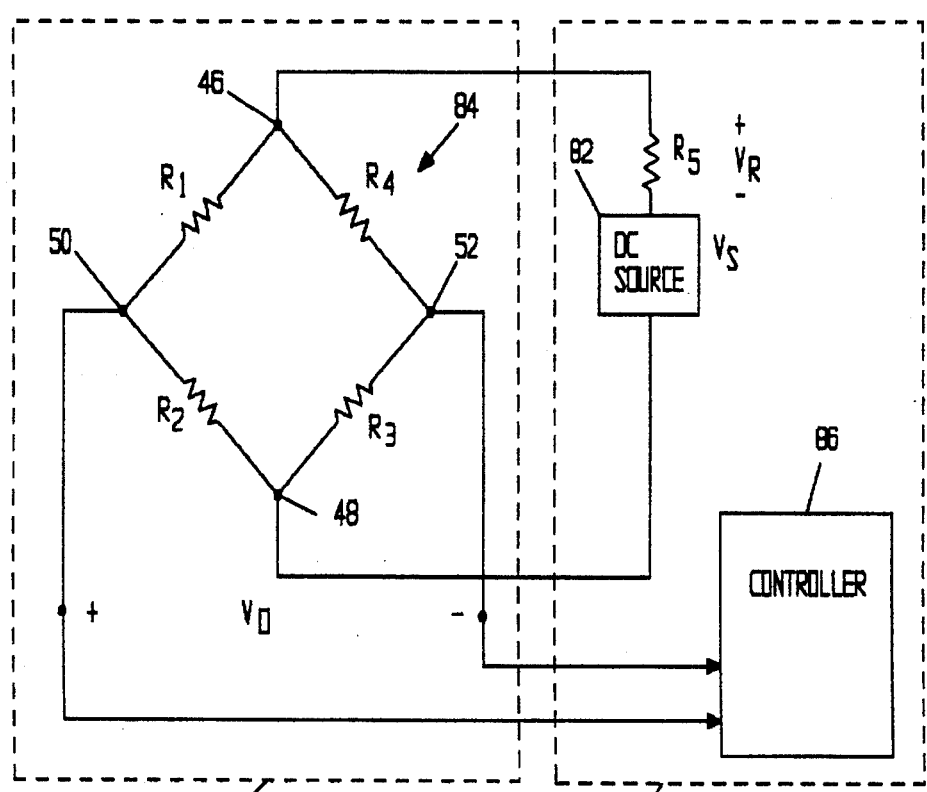
FIG. 6 is a partial electrical-schematic diagram of the pressure measuring apparatus of FIG. 3.

FIG. 6 is an electrical diagram of the pressure sensing structure 80 formed by sensor 10 and logger 12/16. The structure includes a dc source 82, resistor $R_S$, and a resistor bridge 84. The dc source is part of logger 12/16 and generates a dc supply voltage $V_S$. Resistor $R_S$ is connected to the logger wiring panel 74 in series between the source 82 and one connection 46 of the bridge 84. A typical value for $R_S$ is 100 Ω. The bridge 84 is formed on the diaphragm 40 of pressure transducer 30, and includes four resistors $R_1$, $R_2$, $R_3$ and $R_4$. These resistors are fabricated on the silicon diaphragm 40 (FIG. 4) using a 5 KΩ process. Thus, the nominal unstrained value of each resistor is 5000 Ω at 25° C. The temperature coefficient of resistance (TCR) of each resistor is nominally 0.25%/°C. Several other resistors (not shown) are added via a conventional compensation card to obtain the 1% FSO typical performance for an embodiment using a constant excitation current. Without the compensation card the nominal bridge resistance is 5000 Ω. With the compensation card the nominal bridge resistance is approximately 4000 Ω.

The input excitation signal is received at connections 46, 48. The bridge 84's output response signal occurs across connections 50, 52 as voltage signal $V_O$. $V_O$ is output to a controller 86 at data logger 16 and corrected to derive a compensated pressure signal.

Calibration of Pressure Transducer

While the input excitation signal to the pressure sensor 10 is constant, the output signal varies as a function of pressure. If the output signal varied only as a function of pressure, the result would be the ideal pressure transducer yielding 0% error. In practice, however, the piezoresistive response of the diaphragm 40 also varies with temperature and span, yielding a temperature offset error, $\beta_{el}$, and a span error, $\alpha_e$. Thus, the pressure represented by the transducer output voltage is characterized as:

$$P = \alpha_e * V_O + \beta_{el}$$

Figure 7:
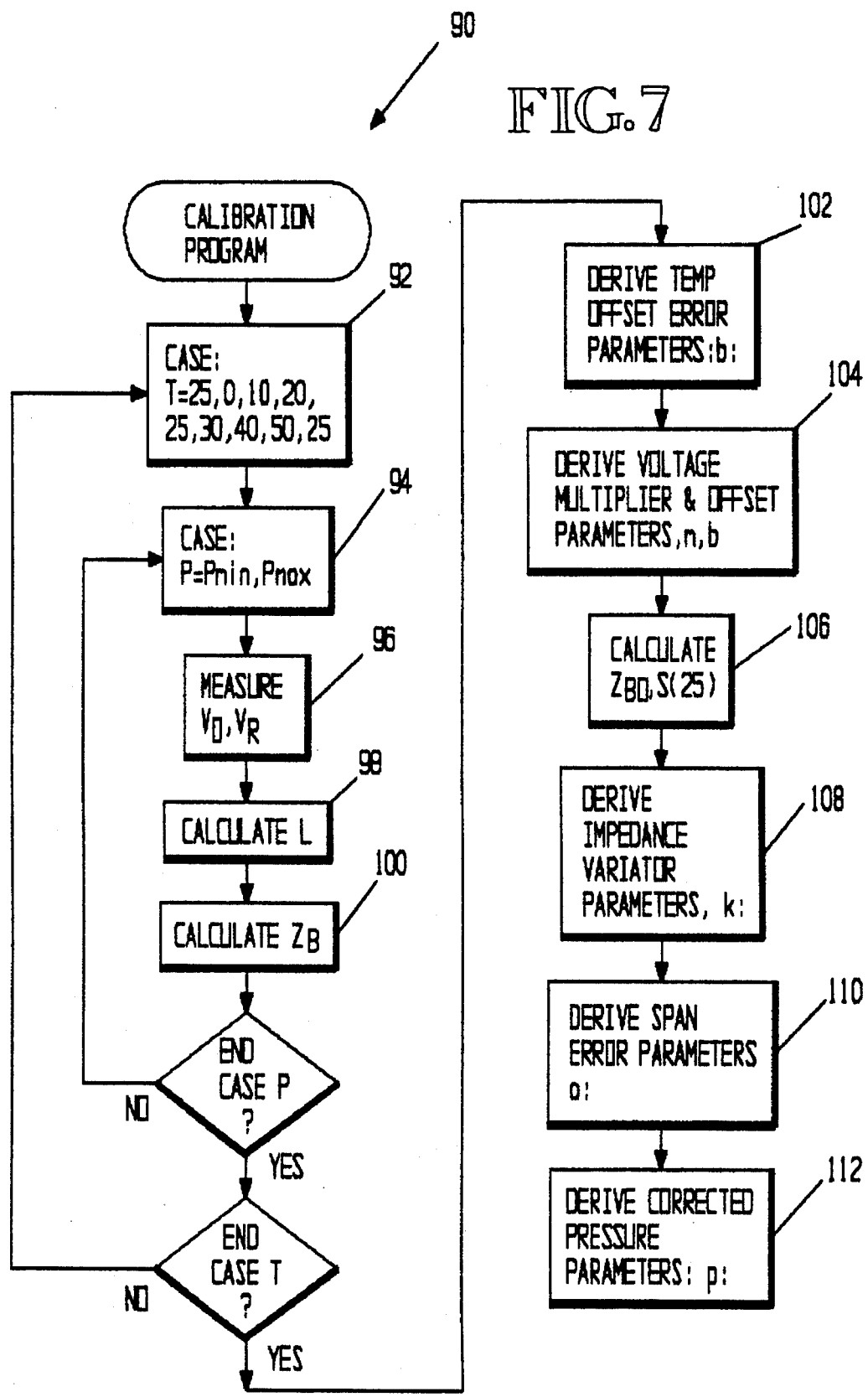
FIG. 7 is a flow chart of the calibration program.

In addition, the values of α and β vary at room temperature from diaphragm to diaphragm. To complicate things, α and β are functions of temperature and such functions typically vary from device to device based on slight material and fabrication differences. According to this invention, temperature is derived from the voltage measurements and compensation functions are implemented to increase measurement accuracy. To do so, each sensor is calibrated. In particular, calibration parameters are defined for various functions, including temperature offset error, span error, impedance variation, and corrected pressure. Calibration of a pressure sensor 10 occurs (at step 20—See FIGS. 1 and 2) in a controlled environment C. A flow chart of the calibration program 90 is shown in FIG. 7. With the sensor placed in environment C, voltage samples are recorded at several known temperatures and known pressures. At steps 92 and 94 cases are defined for taking measurements at different temperatures and pressures. Temperature cases include midrange, and several intervals from zero-scale to full scale operating temperature. Pressure is varied for each case to take samples at zero scale ($P_{min}$) and full scale, $P_{max}$, although different and/or additional known pressures may be used. For 5 psi pressure sensor operating over a range of 0° C. to 50° C., voltage samples are recorded for known pressures of 0 psi and 5 psi for various temperatures within the temperature range. For example, at step 96, $V_O$ and $V_R$ samples are recorded for known pressure P equal to 0 psi and 5 psi at each of known temperatures T equal to 25° C., 0° C., 10° C., 20° C., 25° C., 30° C., 40° C., 50° C., then 25° C. Thus, there are multiple samples $V_O(T,P)$ and $V_R(T,P)$. Based upon the following relationships, current normalized voltage, L, and bridge impedance $Z_B$ are calculated at steps 98, 100 for each temperature and pressure:

$$L(T,P) = V_O/I = (V_O/V_R)R \quad (I)$$

$$Z_B(T,P) = R[(V_S/V_R)-1] \quad (II)$$

where
T=known temperature;
P=known pressure;
$V_O$=measured output voltage;
$V_R$=measured voltage across resistor $R_S$; and
R=resistance of $R_S$.

Calibration parameters are then defined for (a) temperature offset error (step 102), (b) normalized voltage multiplier and offset (step 104), (c) impedance variation, (steps 106, 108), (d) span error (step 110), and (e) corrected pressure (step 112).

TEMPERATURE OFFSET ERROR PARAMETERS (Step 102):

A temperature offset error function is defined as:

$$\beta_{el}(T) = b_2T^2 + b_1T + b_0 \quad (III)$$

where $b_i$ are temperature offset error calibration parameters. To derive the parameters, $b_i$, temperature offset, $\beta_{el}$, is derived at each test temperature as a shift from the $\beta_{el}$ at T=25° C.

$$\beta_{el} \text{ shift } (T) = 100 * \frac{L(T, P_{min}) - L(25° C., P_{min})}{L(25° C., P_{max}) - L(25° C., P_{min})} \quad (IV)$$

Temperature offset errors at each T then is derived as $\beta_{el}(T) = \beta_{el}(25° C.) + \beta_{el}$ shift (T). The derived temperature offset errors and known temperatures then are used to define the parameters $b_i$ of equation III. Such parameters are defined according to a least squares fit of the data.

NORMALIZED VOLTAGE MULTIPLIER AND OFFSET PARAMETERS (Step 104):

Normalized voltage multiplier and offset parameters are used to generate a first pass pressure estimate, $\rho_e$. Such estimate is used in the compensation scheme during field operation. Estimated pressure is the pressure defined as a function of the current normalized voltage, L, as follows:

$$\rho_e = mL + b \quad (V)$$

where
m=normalized-voltage multiplier (PSI/Ω);
L=current normalized voltage; and
b=pressure offset.

Parameters m and b are derived during calibration using the zero-scale and full-scale pressure data samples at the mid-range temperature, 25° C.

$$m = (P_{max} - P_{min})/\{R[(V_{Omax}/V_{Rmax}) - (V_{Omin}/V_{Rmin})]\} \quad (VI)$$

and $$b = -m R (V_{Omin}/V_{Rmin}) \qquad (VII)$$

where $P_{max}$=full scale pressure;

$P_{min}$=zero scale pressure;

R=resistance of $R_S$;

$V_{Omax}$=output voltage at $P_{max}$;

$V_{Omin}$=Output voltage at $P_{min}$;

$V_{Rmax}$=voltage across $R_S$ at $P_{max}$; and $V_{Rmin}$=voltage across $R_S$ at $P_{min}$.

IMPEDANCE VARIATION PARAMETERS (Steps 106, 108):

To account for nonlinearity in bridge impedance over temperature, a corrected temperature estimate, $T_{corr}$, is derived. Such corrected temperature is defined as a function of corrected bridge impedance, where corrected bridge impedance is taken as a percent of the mid-range temperature bridge impedance. Impedance variation parameters $k_i$ define the relationship between corrected temperature and corrected bridge impedance.

$$T_{corr} = k_2 \Delta^2 + k_1 \Delta + k_0 \qquad (VIII)$$

where $k_i$=impedance error parameters; and $\Delta$=corrected bridge impedance as a percent of the mid-range (i.e., 25° C.) impedance.

Corrected bridge impedance, $Z_{Bcorr}$ is derived from the following equation:

$$Z_{Bcorr} = Z_B - [Z_B(25° C., P_{max}) - Z_B(25° C., P_{min})] \rho_e/P_{max}$$

As discussed above, $Z_B$, is derived from equation II for each known temperature, known pressure data set. Such derived $Z_B$ then is corrected based upon the bridge impedance at the mid-range temperature and full scale pressure $(Z_B(25° C., P_{max}))$, the bridge impedance at the mid-range temperature and zero-scale pressure $Z_B(25° C., P_{min})$, the full scale pressure $(P_{max})$, and the estimated pressure $(\rho_e)$. The value for $[Z_B(25° C., P_{max}) - Z_B(25° C., P_{min})]$ is stored as calibration parameter $\Delta(Z_0)$.

Estimated pressure is derived from equation V using the multiplier and offset parameters, m and b, and the L of equation I for the same T and P as the impedance being corrected $Z_B$. As a result, there is a set of corrected bridge impedances, $Z_B(T,P)$. Each corrected bridge impedance then is defined as a percent of the mid-range temperature bridge impedance as follows:

$$\Delta = 100[(Z_{Bcorr} - Z_{B0})/Z_{B0}]$$

where $Z_{B0}$=bridge impedance at mid-range temperature (i.e., 25° C.) (Step 106)

Thus, there is a set of corrected bridge impedances, $\Delta(T,P)$, defined as a percent of mid-range temperature bridge impedance. The impedance variation parameters then can be derived from equation III.

$$T_{corr} = k_2 \Delta^2 + k_1 \Delta + k_0 \qquad (VIII)$$

More specifically, the $k_i$ parameters are derived by applying a least squares fit of the set of $\Delta(T,P)$ values and $T_{corr}$ values for $T_{corr}$ equal to the known temperature, T.

SPAN ERROR PARAMETERS (Step 110):

Span error is the variation in current normalized voltage, L, not accounted for in the temperature offset error. More specifically, it is the error in L which varies with pressure as a function of temperature.

$$\alpha_e(T) = a_2 T^2 + a_1 T + a_0 \qquad (IX)$$

To derive the parameters, $a_i$, span error, $\alpha_e$, is derived at each test temperature as a shift from the $\alpha_e$ at T=25° C.

$$\alpha_e \text{ shift } (T) = 100 * \frac{L(T, P_{max}) - L(T, P_{min})}{L(25° C., P_{max}) - L(25° C., P_{min})} \qquad (IX-A)$$

Span errors at each T then are derived as $\alpha_e(T) = \alpha_e(25° C.) + \alpha_e$ shift (T). The derived span errors and known temperatures then are used to define the parameters $a_i$ of equation IX. Such parameters are defined according to a least squares fit of the data.

CORRECTED PRESSURE PARAMETERS (Step 112):

Corrected pressure is derived from:

$$P'_{corr} = p_3 L_{corr}^3 + p_2 L_{corr}^2 + p_1 L_{corr} + p_0$$

From the environmental controls set during calibration the corrected pressure is to be the known environmental pressure. Specifically, from calibration data at 25° C. a known pressure is applied and current-normalized voltage, L(T=25), is measured. The result is a pressure vs. L characteristic. Ideally the characteristic is a straight line. Actually, errors occur on the order of 0.1% FSO causing the characteristic to vary from the ideal. By using a third order polynomial to derive corrected pressure, a third-order correction is possible.

With $P_{corr}$ known, $L_{corr}$ is derived as follows then plugged into the corrected pressure equation:

$$L_{corr} = L - [\alpha_e(T_{corr}) S(25)/100](\rho_e/P_{max}) - [\beta_e(T_{corr}) S(25)/100] \qquad (X)$$

where S(25) is the one-half-temperature-range span in the current-normalized voltage; i.e., calculated as $L(T=25, P=P_{max}) - L(T=25, P=P_{min})$ at Step 106.

In the field, a measured L at a temperature T is mapped to the L that it would be at 25° C. to achieve $L_{corr}$. This $L_{corr}$ is then used with the pressure parameters p to calculate a corrected pressure, $P_{corr}$.

STORED CALIBRATION PARAMETER SET:

From the above derivations, the following calibration parameters are derived and stored:

| | | |
|---|---|---|
| 1. Pressure range | 8. $b_0$ | 15. $\Delta(Z_0)$ |
| 2. offset, b | 9. $b_1$ | 16. $\alpha$ |
| 3. S(25) | 10. $b_2$ | 17. $p_0$ |
| 4. R | 11. $k_0$ | 18. $p_1$ |
| 5. $a_0$ | 12. $k_1$ | 19. $p_2$ |
| 6. $a_1$ | 13. $k_2$ | 20. $p_3$ |
| 7. $a_2$ | 14. $Z_{B0}$ | |

During calibration of an individual sensor 10 having an operating temperature range of 0° C. to 50° C. and a pressure range of 0 psi to 5 psi, the following parameter set was derived:

| | | |
|---|---|---|
| 1. P range = 5 | 8. $b_0$ = 0.4901 | 15. $\Delta(Z_0)$ = −19 |
| 2. b = −1.889 | 9. $b_1$ = −0.00905 | 16. $\alpha$ = 0.21 |
| 3. S(25) = 58.588 | 10. $b_2$ = −.0004207 | 17. $p_0$ = 0.1602 |
| 4. R = 100 | 11. $k_0$ = 25.1848 | 18. $p_1$ = 0.08481 |

-continued

| | | |
|---|---|---|
| 5. $a_0 = 0.4321$ | 12. $k_1 = 4.6860$ | 19. $p_2 = 9.6369 \times 10^{-6}$ |
| 6. $a_1 = -0.03103$ | 13. $k_2 = -0.04410$ | |
| 7. $a_2 = 0.0005675$ | 14. $Z_{B0} = 4239$ | 20. $p_3 = 0$ |

A source code listing of the calibration program 90 is listed in Appendix A.

Pressure Measurement and Compensation

Once a sensor 10 has been calibrated it is able to yield increased accuracy during field operations. As shown in FIG. 3 the sensor 10 is connected to a field data logger 16. The calibration parameters are downloaded into the field data logger 16 for use during pressure measurement and compensation. The sensor 10 then is exposed to a field environment to capture pressure samples, or more specifically, to capture output voltage, $V_O$, samples for use in deriving pressure samples. A voltage sample occurring across normalizing resistor, $R_S$, also is captured.

Figure 8:
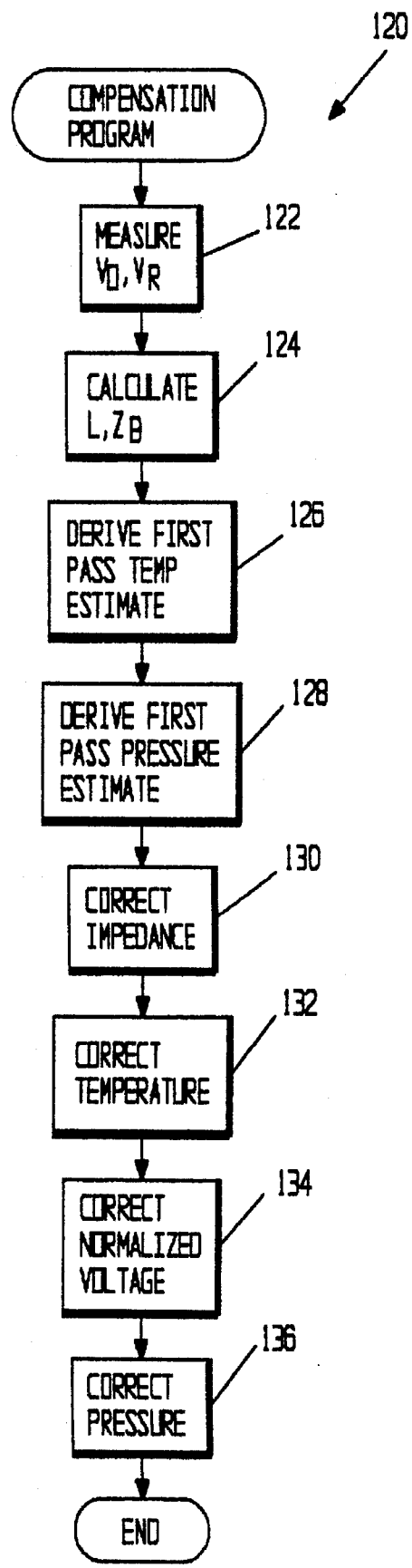
FIG. 8 is a flow chart of the compensation program.

FIG. 8 shows a flow chart of the compensation program 120 which converts the pair of sampled voltages into a pressure measurement. At step 122 a sample is taken by capturing voltages, $V_O$ and $V_R$. At step 124 current normalized voltage, L, and bridge impedance, $Z_B$ are calculated, according to the following equations:

$$L=V_O/I=(V_O/V_R) R \quad (XI)$$

$$Z_B=R[(V_S/V_R)-1] \quad (XII)$$

where $V_O$=measured output voltage;

$V_R$=measured voltage across resistor $R_S$; and

R=resistance of $R_S$.

For a given sample, first-pass temperature and first-pass pressure estimates are derived, then used to generate corrected impedance and corrected current normalized voltage values. A corrected pressure value then is derived from the corrected current normalized voltage.

FIRST PASS TEMPERATURE ESTIMATE—$T_e$ (Step 126):

At step 126, the first pass temperature estimate is determined according to equation XIII:

$$T_e=[100 Z_B/\alpha Z_{B0}]+[T_{mid}-(100/\alpha)] \quad (XIII)$$

where $\alpha$=a constant,(i.e., temperature coefficient of bridge resistance);

$T_{mid}$=mid-range temperature (i.e., 25° C.);

$Z_{B0}$=bridge impedance at $T_{mid}$ (determined during calibration and stored for recall here); and $Z_B$=bridge impedance calculated at equation XII.

The first-pass temperature estimate is used to determine a first-pass temperature offset error, which in turn is used to determine the first-pass pressure estimate.

FIRST PASS PRESSURE ESTIMATE—(Step 128):

At step 128, the first pass pressure estimate is determined according to equation XIV:

$$p_e=mL_1+b \quad (XIV)$$

where m=voltage multiplier parameter (Eqn. VI);

$L_1$=adjusted current normalized voltage; and b=voltage offset parameter (Eqn. VII).

$L_1$ is the current normalized voltage, L, adjusted based upon a first-pass estimate of the temperature offset error. The first pass-estimate of temperature offset error is defined by equation XV:

$$\beta_{el}(T_e)=b_2T_e^2+b_1T_e+b_0 \quad (XV)$$

where $b_i$=stored temperature offset error calibration parameters; and $T_e$=first pass estimated temperature (Eqn. XIII).

The adjusted current normalized voltage, $L_1$, is defined by equation XVI:

$$L_1=L-\beta_{el}(T_e)[S(25)/100] \quad (XVI)$$

where

L=calculated current normalized voltage (Eqn. XI);

$\beta_{el}(T_e)$=estimated temperature offset error (Eqn XV); and

S(25)=mid-range temperature span in the normalized current impedance; i.e., L(25)–L(0) stored during calibration.

The first-pass pressure estimate then is used to derive a corrected impedance and a corrected temperature.

CORRECTED BRIDGE IMPEDANCE, $Z_{Bcorr}$ (Step 130):

At step 130, the calculated bridge impedance, $Z_B$, of equation XII is corrected using equation XVII:

$$Z_{Bcorr}=Z_B-[\Delta(Z_0) (p_e/P_{max})] \quad (XVII)$$

where $Z_B$=calculated bridge impedance (Eqn. II);

$p_e$=estimated pressure (Eqn. XIV);

$P_{max}$=full scale pressure; and $\Delta(Z_0)$=a calibration parameter which is the bridge impedance at the mid-range temperature and full scale pressure minus the bridge impedance at the mid-range temperature and zero-scale pressure.

CORRECTED TEMPERATURE, $T_{corr}$ (Step 132):

At step 132, a corrected temperature is derived based upon the corrected bridge impedance. First, the corrected bridge impedance is defined as a percent of the mid-range temperature bridge impedance using equation XVIII:

$$\Delta=100 [(Z_{Bcorr}-Z_{B0})/Z_{B0}]$$

where $Z_{B0}$=bridge impedance at mid-range temperature stored during calibration;

$Z_{Bcorr}$=corrected bridge impedance (Eqn. XVII).

Then, the corrected temperature is defined using equation XIX:

$$T_{corr}=k_2\Delta^2+k_1\Delta+k_0 \quad (XIX)$$

where $k_i$ =calibration parameters. The corrected temperature then is used to determine a corrected current normalized voltage.

CORRECTED CURRENT NORMALIZED VOLTAGE—$L_{corr}$ (Step 134):

At step 134 the current normalized voltage, L, is corrected. First, a temperature offset error, $\beta_{el}(T_{corr})$, and a span error, $\alpha_e(T_{corr})$, are defined for the corrected temperature using equations XX and XXI, respectively:

$$\beta_{el}(T_{corr})=b_2T_{corr}^2+b_1T_{corr}+b_0 \quad (XX)$$

where $b_i$=stored temperature offset error calibration parameters; and $T_{corr}$=corrected temperature (Eqn. XIX), and $$\alpha_e(T_{corr})=a_2T_{corr}^2+a_1T_{corr}+a_0 \qquad (XXI)$$

where $a_i$=stored span error calibration parameters; and $T_{corr}$=corrected temperature (Eqn. XIX).

Then, the current normalized voltage, L, is corrected for temperature offset error and span error using equation XXII:

$$L_{corr}=L-[\alpha_e(T_{corr})\ S(25)/100](p_e/P_{max})-[\beta_e(T_{corr})S(25)/100] \qquad (XXII)$$

where

L=current normalized voltage (Eqn. XI);

$\alpha_e(T_{corr})$=span error (Eqn. XXI);

S(25)=mid-range temperature span in the current normalized voltage: (L(25)– L(0)) stored during calibration;

$p_e$=first pass estimated pressure (Eqn. XIV);

$P_{max}$=full scale pressure; and $\beta_e(T_{corr})$=temperature offset error (Eqn. XX)

CORRECTED PRESSURE—$P_{corr}$ (Step 136):

At step 136, a corrected pressure value is derived from the corrected current normalized voltage using equation XXIII:

$$P_{corr}=p_3L_{corr}^3+p_2L_{corr}^2+p_1L_{corr}+p_0 \qquad (XXIII)$$

where $P_i$=stored pressure calibration parameters; and $L_{corr}$=corrected current normalized voltage (Eqn. XXII).

By compensating for temperature offset error and span error using calibration parameters, first and second order variations in temperature offset error and span error are substantially eliminated. Accordingly, sensor 10 accuracy is substantially improved so as to yield error bands within approximately 0.03% of full scale pressure.

Alternative Embodiments

An electrical schematic diagram of an alternative measuring apparatus embodiment 140 is shown in FIG. 9. Comparing the alternative embodiment 140 to the embodiment 80 of FIG. 6, like parts are given like part numbers. According to the alternative embodiment, the compensation process is performed by a pressure sensor 10'. Referring to FIGS. 4, 6 and 9, the sensor 10' is similar to the sensor 10, but includes a resident processor 142, a series resistor $R'_S$, and excitation control circuitry 144. The processor 142 preferably is an 8-bit microprocessor, although a 4-bit processor or larger processors may be used. Memory (not shown) also is included for storing the compensation program 120 and the calibration parameters. $R'_S$ serves the same function as resistor $R_S$ of FIG. 6, but is located within sensor 10' instead of being connected between the sensor 10 and data logger 12, 16. Excitation control circuitry 144 supplies a voltage signal corresponding to $V_S$. Circuit power may be provided from the logger or internally according to alternative embodiments.

The compensation program 140 is stored in memory within the sensor 10'. During field operation, the program 140 is executed. Processor 142 captures the output voltage, $V_O$, sample and the resistor voltage, $V_R$, sample, then computes the corrected pressure according to the compensation program 140, shown in FIG. 8. The corrected pressure is output to the field data logger 16 for storage, display and/or printout.

To calibrate the sensor 10' a signal is sent from the data logger 12 to the sensor 10' to indicate that the processor 142 should operate in a calibration mode. During calibration mode, the processor 142 simply forwards the output voltage, $V_O$, and resistor voltage, $V_R$, to the logger 12's controller 86. Controller 86 executes the calibration program 80 as previously described with respect to FIG. 7. After the calibration data samples are captured, the controller 86 derives the calibration parameters, then downloads the parameters to the sensor 10'. Sensor 10' stores the parameters in memory for access during field operations. According to one embodiment, an SDI-12 interface is implemented between the sensor 10' and data loggers 12 and 16.

FIG. 10 shows an overview of the improved pressure measuring process for the sensor 10' embodiment of FIG. 9. At step 150, sensor 10' is calibrated with calibration parameters being downloaded into sensor 10' memory. At step 152, the sensor 10' captures field data. At step 154, the field data is processed to derive a pressure signal. Such pressure signal has an error band approximating 0.03% of full scale pressure.

According to another embodiment, the processor 142 also executes the calibration program. During calibration, the logger downloads pressure and temperature data to the sensor 10'. Processor 142 then derives and stores the calibration parameters from the downloaded data and measured data.

Problem and Means for Solving Problem

The pressure measuring apparatus of this invention addresses the problems of temperature-induced errors occurring in strain-gauge pressure transducers. In particular, non-linear temperature offset errors and a non-linear span errors occur in a strain gauge as a function of temperature and pressure. Another problem is that compensation schemes tailored for a class of devices do not account for individual differences in material and workmanship.

To address the temperature offset error and span error problems a dynamic digital compensation scheme is implemented. To address the variations occurring from device to device, a calibration scheme is implemented which customizes a set of parameters used during compensation.

A processor is included within the pressure measuring apparatus of this invention to execute a calibration program and a compensation program. During calibration a set of parameters is defined. The set then is downloaded to a memory accessible by the compensation program's processor. During field operation, a raw data sample is processed to yield a compensated pressure measurement within an error band of approximately 0.03% FSO. In one embodiment, the compensation program processor is part of a pressure sensor. The sensor derives the compensated pressure measurement and outputs the value to a data logger. In another embodiment, the compensation program processor is part of a data logger. The pressure sensor sends the raw data sample to the data logger, which then generates the compensated pressure measurement. In one embodiment the calibration program is executed by a processor in the data logger. In another embodiment the calibration program is executed by a processor in the sensor.

Meritorious and Advantageous Effects

One meritorious and advantageous effect of the invention is that a relatively inexpensive strain gauge can be adapted to substantially reduce its error band from approximately 1% to approximately 0.03%. The increased accuracy enables strain gauge technology to be used in many high-accuracy applications previously served by more expensive technologies.

Another advantageous effect is that temperature measurements are obtained from the bridge structure without the need of additional temperature sensors, additional signal conditioning or additional calibration.

Although a preferred embodiment of the invention has been illustrated and described, various alternatives, modifications and equivalents may be used. For example, although a method employing a constant-voltage excitation signal is described, the invention alternatively may use a constant-current excitation signal. Also, although the embodiments are described for a specific temperature range and pressure range, such ranges may vary. The resistance values of the components may vary. Further, although a silicon diaphragm is disclosed, other diaphragm materials may be used. Therefore, the foregoing description should not be taken as limiting the scope of the inventions which are defined by the appended claims.

Appendix A

CALIBRATION COMPUTER PROGRAM LISTING

© 1994, Instrumentation Northwest, Inc.
(Unpublished)

PREPRODUCTION VERSION  JANUARY 1994

```
/********************************************************************
```

PROGRAM E.C

VERSION 1.0

This is the first version of the program to characterize the 9104(5) transducers over temperature and pressure. This program will use the digital I/O card (ref: DIO.C) to control pressure from a dedicated deadweight tester to the manifold. The DAC will be buffered and used to set the excitation level for the transducers ref (play1.c, play2.c and play3.c).

Mux 0 contains channels 0 - 31. Channel 0 is dedicated temperature measurement. Channels 1 through 31 are used for PS-9000 4 -20 mA measurement using 47.5 Ohm resistors.

Mux 1 contains channels 32 - 63. Channel 32 is dedicated to measuring the excitation levels for the PS-9102/PS-9104 power bus. Channels 33 - 63 are used to measure the differential output voltage for PS-9104 testing and will also be used for PS-9102 output voltage. In the case of the PS-9104, the negative excitation leads will be routed to Mux 2 for series resistor measurements.

Mux 2 contains channels 64 - 95. This is used for the series resistors for PS-9104 testing. Channel 33 corresponds to channel 64, 34 to 65 and so on. This gives an i, i+31 relationship for signal processing.

It should be noted that a version 1.1 PS-9102 test program has been written but not yet used as a production standard. The DAC excitation technique should be incorporated into an upgraded version of this software to eliminate potential supply contention problems.

DAC 0 will be used to set the excitation level. This will be buffered and sent to the PS-9102/PS-9104(5) power bus. See program PLAY3.C for an example of simultaneous A/D and D/A operation. Channel 32, on Mux 1, will monitor the voltage at the power bus.

The pressure control signal will be generated using the DT2817 digital I/O card. Specifically, port 0, bit 0 will be utilized for pressure control. A comparator (preferably with hysteresis) will be utilized to accomodate the power-up uncertanty levels on the outputs. See Program DIO.C for additional documentation and an example of initialization and manipulation of this device. The manifold will be either vented to atmoshpere or connected to the deadweight tester output.

The DT2817 is configured as follows:

| CONTROL REGISTER: | 228H |
|---|---|
| PORT 0: | 229H |
| PORT 1: | 22AH |
| PORT 2: | 22BH |
| PORT 3: | 22CH |

Port 0 will be configured for output and the remeining ports will be configured for input to reduce hardware damage risk.

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*/

```
#include <stdio.h>
include <time.h>
#include <string.h>
include <math.h> char      *driver_name = "DT283X$0";
int            unit    =  0;
int       i, m, n, p, q;
int       *iptr;
int            istat;
int       num_ducers;
```

PREPRODUCTION VERSION                    JANUARY 1994

```
int         handle;
int         DA_SECTION;
long        data_value[2];          /* DAC output values */
int         temp_data, vs_data, vo_data, vr_data;   /* ADC input values */
int         temp_channel, vo_channel, vs_channel, vr_channel;
int         temp_gain, vo_gain, vs_gain, vr_gain;
int         scan_counter;

int         time_to_scan;
int         time_to_log;
int         running;
int         first_log;

long        timeval, time_val1, time_val2;
long        *tval1ptr;      /* points to time_val1 */
long        *tval2ptr;      /* points to time_val2 */
long        *timer;         /* timer points to timeval */
long        time_start;
long        *tstartptr;     /* points to time_start */
long        time_last_log;
long        time_last_scan;
long        timetemp;

float       temp_voltage, ave_temp_voltage;
float       vo_voltage, ave_vo;
float       vr_voltage, ave_vr;
float       vs_voltage, ave_vs;
float       temperature;
float       temp_gain_factor, vs_gain_factor, vo_gain_factor;
float       vr_gain_factor;
float       vo[33], vr[33], vs;

char        data_file[16];
char        *joe;
char        timestuff[30];
char        *chptr;
char        c, d;
char        junk;

double      seconds;
double      minutes;

FILE        *snptr;
FILE        *fptr;

struct dude
{
int     sing_chan;
int     sing_gain;
int     sing_dacs;
} sgl;

struct dudeness
```

PREPRODUCTION VERSION

JANUARY 1994

```c
{
        float   elap_time;
        float   temp;
        long    sn[34];
        float   l_low_zero[34];
        float   l_low_five[34];
        float   l_high_zero[34];
        float   l_high_five[34];
        float   zb_low_zero[34];
        float   zb_high_zero[34];
} scan_data;

struct mike
{
        int     num_units;
        int     board_id;
        int     base_address;
        char    driver_version[10];
        int     dma_channel_1;
        int     dma_channel_2;
        int     interrupt_level;
        int     board_timeout;
        int     mux_id;
        int     ad_setup_bits;
        int     da_setup_bits;
        int     ad_sect_range;
        int     da_sect_range0;
        int     da_sect_range1;
        int     chan_onbrd;
        int     chan_offbrd;
        int     thrsh;
        int     cgl_config;
} brd_struct;

void cls(void);

main()
{ joe = ×tuff[0];
iptr = &i;
timer = &timeval;
tval1ptr = &time_val1;
tval2ptr = &time_val2;
tstartptr = &time_start;

vo[0] = -1.0;
vr[0] = -1.0;

cls();

brd_struct.num_units = 1;
        brd_struct.board_id = 0;
```

```
        brd_struct.base_address = 0;
        strcpy( brd_struct.driver_version, "RMM.VVxxx" );
        brd_struct.dma_channel_1 = 0;
        brd_struct.dma_channel_2 = 0;
        brd_struct.interrupt_level = 10;
        brd_struct.board_timeout = 60;
        brd_struct.mux_id = 0;
        brd_struct.ad_setup_bits = 0x7000;
        brd_struct.da_setup_bits = 0x0303;
        brd_struct.ad_sect_range = 0;
        brd_struct.da_sect_range0 = 0;
        brd_struct.da_sect_range1 = 0;
        brd_struct.chan_onbrd = 0;
        brd_struct.chan_offbrd = 0;
        brd_struct.thrsh = 0;
        brd_struct.cgl_config = 0;

/* set pressure to zero, DAC outputs to 0.8 Volts and greet technician */ outp(0x228, 0x01);
        outp(0x229, 0x00);

istat = dt_initialize (driver_name, &handle);
        istat = dt_reset (unit, handle);

sgl.sing_chan = 0;
        sgl.sing_gain = 0;
        sgl.sing_dacs = 3;
        DA_SECTION = 1;
        data_value[0] = 0x0a3d;
        data_value[1] = 0x0000;

istat = dt_single_acq
                    (unit, handle, DA_SECTION, data_value, &sgl);

istat = dt_terminate (handle);

timeval = time(timer);
joe = ctime(timer);

printf("\n");
        printf("\n");
        printf("PS-9104(5) ENHANCED MEASUREMENT CHARACTERIZATION PROGRAM\n");
        printf("\n");
        printf("MUX 0 CHANNEL 0 IS DEDICATED TO TEMPERATURE\n");
        printf("\n");
        printf("MUX 0 CHANNELS 1 - 31 ARE DEDICATED TO PS-9000\n");
        printf("\n");
        printf("MUX 1 CHANNEL 0 (32) IS DEDICATED TO PS-9102/PS-9104(5) EXCITATION\n");
        printf("\n");
        printf("MUX 1 CHANNEL 1 - 31 (33 - 63) ARE FOR DIFFERENTIAL OUTPUTS\n");
        printf("\n");
```

```
printf("MUX 2 CHANNELS 0 - 31 (64 - 95) ARE SERIES RESISTORS FOR MUX 1\n");
printf("\n");
printf("CHANNEL 33 CORRESPONDS TO 64, 34 TO 65 AND SO ON\n");
printf("\n");
printf("THE SYSTEM TIME AND DATE IS: %s\n", ctime(timer));
printf("\n");

retry_cont:;

printf("Do you wish to continue ? (Y/N) \n");
        printf("\n");

c = getch();
                c = tolower(c);
                if(c == 'n')
                    goto bail_out;
                if(c != 'y')
                    goto retry_cont;

/*********************************************************************/
/*********************************************************************/
/************** set up date/batch coded data file *********************/
/*********************************************************************/
/*********************************************************************/ cls();

/*
printf("ENTER THE TEST NUMBER FOR TODAY (0-9):");
d = getch();
*/

/*
data_file[0] = 'C';
data_file[1] = ':';
data_file[2] = '\\';
data_file[3] = *(joe + 4);
data_file[4] = *(joe + 5);
data_file[5] = *(joe + 6);
data_file[6] = *(joe + 8);
data_file[7] = *(joe + 9);
data_file[8] = *(joe + 22);
data_file[9] = *(joe + 23);
data_file[10] = d;
data_file[11] = '.';
data_file[12] = 'D';
data_file[13] = 'A';
data_file[14] = 'T';
data_file[15] = '\0';
chptr = data_file;
*/

/*
    I am going to start with a fixed name data file due to null
``` pointer problems encountered when trying to append data in the
log routine with a pointer if((fptr = fopen(chptr, "r"))  != 0)
*/ if((fptr = fopen("C:\\9104ECHR.DAT", "r"))  != 0)
   {
   fclose(fptr);
   cls();
   printf("\a\n");
   printf("\a\n");
   printf("\a\n");
   /*
   printf("WARNING: THIS DATE/BATCH CODE FILE EXISTS\n");
   */
   printf("WARNING: THIS 9104ECHR.DAT FILE EXISTS\n");
   printf("\n");
   printf("DO YOU WISH TO OVERWRITE IT (Y,N) ?\n");

c = getch();
               c = tolower(c);
               if(c == 'n')
                  goto bail_out;
               if(c =='y')
                  {
                  goto over_write;
                  }
               goto bail_out;
   } if( fptr ==  0)
   {
   fptr = fopen( "C:\\NULLFIX.DAT", "wt");
   fprintf(fptr, "%s\n", "fix for null pointer");
   fclose(fptr);
   }
over_write:;

/* ************************************************************ */
/* ************************************************************ */
/* ******* GET CHANNEL/SERIAL NUMBER INFORMATION ********** */
/* ************************************************************ */
/* ************************************************************ */ retryread:;
         printf("\n");
         printf("Do you wish to read in S/N setup ? (Y/N)");
         c = getch();
         c = tolower(c);
         if(c == 'y')
            {

```
        snptr = fopen("c:\\SNSETUP.DAT", "rt");
        rewind(snptr);
        fscanf( snptr, "%i\n", &num_ducers);
        fscanf( snptr, "%i\n", &scan_data.sn[0]);
        fscanf( snptr, "%i\n", &scan_data.sn[0]);
        for (i=1; i < num_ducers+1; i++)
                fscanf(snptr, "%li\n", &scan_data.sn[i]);
        goto echoem;
        }
    if(c != 'n')
       goto retryread;

printf(" \n" );
        printf(" \n" );
        printf("How many Transducers this cycle ? (1-31) " );
        scanf("%i" , &num_ducers);
        if(num_ducers < 1)
        goto bail_out;
        if (num_ducers > 31)
        goto bail_out;
        printf(" \n" );

retrysetup:;

printf(" \n" );
        printf("Do you wish to continue with S/N set up ? (Y/N)");
        c = getch();
        c = tolower( c );
        if(c == 'n' )
        goto bail_out;
        if(c != 'y')
        goto retrysetup;

scan_data.sn[0] = 0;
        for ( i = 1; i < num_ducers+1; i++ )
        {
        printf("\nEnter Channel %i S/N   " , i);
        scanf("%li" , &scan_data.sn[i]);
        }

/* Echo Channel and S/N data back to user   */
/* Allow for edit option of selected channel */ echoem:;
  c = 'y';
  while(c == 'y')
     {
        printf(" \n" );
        printf(" \n" );
        printf("Channel and S/N data is as follows:  \n" );
        printf(" \n" );
        printf(" \n" );
```

```
             if(num_ducers < 17)
                for ( i = 1; i < num_ducers+1; i++ )
                    printf("Channel: %i Monitoring S/N: %li \n" , i, scan_data.sn[i]);
             else
                {
                for( i = 1; i < 17; i++ )
                    printf("Channel: %i Monitoring S/N: %li \n" , i, scan_data.sn[i]);
                printf("Any key to continue");
                junk = getch();
                printf("\n");
                printf("\n");
                printf("\n");
                for (;i < num_ducers+1; i++)
                    printf("Channel: %i Monitoring S/N: %li \n" , i, scan_data.sn[i]);
                } printf(" \n" );

retryedit:;

printf(" \n" );
             printf("Do you wish to edit this information ? (Y/N) \n " );
             c = getch();
             c = tolower(c);
             if(c != 'y')
                {
                if(c != 'n')
                  goto retryedit;
                } if(c == 'y' )
                {
retrychan:;
                printf("Enter Channel Number ");
                scanf("%i", iptr);
                i = *iptr;
                if(i > num_ducers)
                    {
                    printf("You cannot add channels under edit option.\n");
                    goto retrychan;
                    }
                if(i == 0)
                    {
                    printf("Channel 0 on the PS-9102/PS-9104(5) test board is reserved for excitation.\n");
                    printf("Channel 0 on the PS-9000 test board is reserved for temperature.\n");
                    goto retrychan;
                    }
                printf("\nEnter Channel %i S/N   " , i);
                scanf("%li" , &scan_data.sn[i]);
                }
        } snptr = fopen( "C:\\SNSETUP.DAT" , "wt" );
             fprintf(snptr, "%i\n", num_ducers);
```

```
        fprintf(snptr, "%i\n", scan_data.sn[0]);
        fprintf(snptr, "%i\n", scan_data.sn[0]);
        for(i=1;i< num_ducers + 1; i++)
           fprintf(snptr, "%li\n", scan_data.sn[i]);
        rewind(snptr);
        fclose(snptr);
```

/*********************************************************************

At this point, either the selected date/batch file does not exist or
we have decided to overwrite it. Since we now know the number of
transducers and we might need this in the analysis program, we will
write it now. This will overwrite an existing file or create a new
one. We will be consistant with the serial number set up file in
the first three writes to the file. That is, the first three lines will
be as follows:

num_ducers
        scan_data.sn[0]
        scan_data.sn[0]

Recall that the device serial numbers on channel zero on MUX 0
and MUX 1 are system channels. These sn writes serve as place holders.

*********************************************************************/
```
/*
        fptr = fopen(chptr, "wb");
        fwrite(&num_ducers, sizeof(num_ducers), 1, fptr);
        fwrite(&scan_data.sn[0], sizeof(scan_data.sn[0]), 1, fptr);
        fwrite(&scan_data.sn[0], sizeof(scan_data.sn[0]), 1, fptr);
        fclose(fptr);
*/
/*
        fptr = fopen(chptr, "wt");
*/ fptr = fopen("C:\\9104ECHR.DAT", "wt");
        fprintf(fptr, "%d\n", num_ducers);
        fprintf(fptr, "%li\n", scan_data.sn[0]);
        fprintf(fptr, "%li\n", scan_data.sn[0]);
        fclose(fptr);
```

/* *****************************************************************/

/* The serial number code was copied from the 9102 V1.1 program. It is noted that even if the serial numbers are read in and the data is not modified, the file is written over. This is not a problem, only an ineffeciency. This code will not be modified for the first version of this application.            */

/****************************************************************/

```
        cls();
        printf("THE SET-UP CAN BE TESTED USING THE VERIFY PROGRAM.\n");
        printf("\n");
        printf("IT IS ADVISABLE TO RUN THE CHAMBER AT 25 C FOR A FEW\n");
        printf("\n");
        printf("MINUTES BEFORE STARTING THE TEST.\n");
        printf("\n");
        printf("THE TEST WILL TIME OUT 15 HOURS AFTER IT IS STARTED.\n");
        printf("\n");
        printf("_____\n");
        printf("\n");
        printf("INSURE THE HARDWARE IS PROPERLY SET-UP.\n");
        printf("\n");
        printf("THE TEST TEMPERATURE SEQUENCE IS: 25 0 10 20 25 30 40 50 25\n");
        printf("\n");
        printf("ONE HOUR IS ALLOWED FOR TRANSITION AND STABLIZATION AT ALL POINTS\n");
        printf("\n");
        printf("EXCEPT FOR THE FINAL 25 C VALUE. HERE, FIVE HOURS ARE ALLOWED.\n");
        printf("\n");
        printf("BEGIN CHAMBER PROGRAM FILE nnn AND PRESS ANY KEY.\n");
        printf("\n");
        printf("\n");
        printf("\n");
        printf("\n");
        junk = getch();
```

/* ************************************************************ */
/* ************************************************************ */
/* **************** Control Routine *********************** */
/* ************************************************************ */
/* ************************************************************ */
/*
    Some documentation of the scanning/logging process is in order. The system is initialized by setting the excitaion level to 0.8 V and the pressure to zero. The hierarchy of

PREPRODUCTION VERSION
JANUARY 1994 the scan and log event structure is such that a scan must be
executed before a log event may be enabled. That is, the log
execution code is nested within the scan execulation code.
A scan event keeps the pressure at zero, takes the appropriate
measurements at 0.8 V then 1.5 V. If a log is not executed, the
excitation is returned to 0.8V and the pressue remains at 0.
If a log is executed, the log sequence is entered at 1.5 V and the
pressure is applied. The 1.5 V, max pressure data is taken followed
by the max pressure 0.8 V data. The pressure is then returned to
zero and the log sequence is exited with excitation remaining at 0.8 V.
Following a log, the data is writted to the date coded binary file.
It should be noted that 90 seconds are allowed for stabilization after
the pressure is changed. When the excitation level is changed, 1 second
is allowed. This means that a scan sequence will take on the order
one second. A complete log sequence will take on the order of 1.5
minutes.

```
*/
/* **************************************************************** */
/* **************************************************************** */
/* **************************************************************** */
/* **************************************************************** */ time_start = time(timer);
        timeval = time_start;
        timetemp = time_start;
        time_to_scan = 0;
        time_to_log = 0;
        running = 1;
        first_log = 1;

/*
```

Set up the default gain parameters. Note that we will reduce the gain
for the output measurement in the case of 1.5 V excitation. Note that we
could potentially improve the offset measurement by maximizing the gain for the zero pressure data.
*/

```
            vo_gain = 3;
            vo_gain_factor = 500.0;
            vr_gain = 2;
            vr_gain_factor = 100.0;
            vs_gain = 0;
            vs_gain_factor = 1.0;

vs_channel = 32;

while(timeval < (time_start + 54000))   /* initial test end at 15 hours */
        { timeval = time(timer);

if(kbhit() != 0)
            {
            junk = getch();
            cls();
            printf("\n");
            printf("\n");
            printf("\n");
            printf("\n");

printf("WARNING: DO YOU WISH TO TERMINATE THE TEST (Y/N) ?");

for(i = 1; i < 10; i++)
                printf("\n");
            c = getch();
            c = tolower(c);
            if (c == 'y')
                goto bail_out;
            if (c != 'y')
                {
                timeval = time(timer);
                printf("RESUMING THE TEST, WAIT BRIEFLY");
                goto resume;
                }
            }
resume:;
```

/*********************************************************************/
/*********************************************************************/
/*
  Scan at 5, 20, 35 and 50 second times.

Log at 60, 120, 180, 240, 300, 360, 420, 480, 540, 600, 660, 720, 780 minutes and 0 seconds.

```
*/
/****************************************************************************/
/****************************************************************************/ seconds = fmod((double) (timeval - time_start), 60.0);
    minutes = (((double) (timeval - time_start)) - seconds)/60.0;

if(seconds == 5.0 || seconds == 20.0 || seconds == 35.0 || seconds == 50.0)
     {
     time_to_scan = 1;
     time_to_log = 0;
     }
    if((fmod(minutes, 15.0) == 0.0) && seconds == 0.0)
     {
     time_to_scan = 1;
     time_to_log = 1;
     } if(time_to_scan == 1)
     {
        timeval = time(timer);
        scan_data.elap_time = (float) ((timeval - time_start)/60.0);
        scan_counter = 0;
        goto scan;
        done_scan1:;
        scan_data.temp = temperature;

/* process for P=0, Vex=0.8V */
        for(n=1; n < num_ducers + 1; n++)
            {
            scan_data.l_low_zero[n] = 100.0 *(vo[n]/vr[n]);
            scan_data.zb_low_zero[n] = 100.0 *((vs/vr[n])-1);
            }

/* keep P=0, set Vex to 1.5V, delay 1 sec and scan again */ vo_gain = 2;
        vo_gain_factor = 100.0;

istat = dt_initialize (driver_name, &handle);
        istat = dt_reset (unit, handle);

data_value[0] = 0x1333;
        data_value[1] = 0x0000;

istat = dt_single_acq
                    (unit, handle, DA_SECTION, data_value, &sgl);

istat = dt_terminate (handle);
```

```
          time_val1 = time(tval1ptr);
          time_val2 = time_val1;
            while(time_val2 - time_val1 < 2)
                    time_val2 = time (tval2ptr);

goto scan;
          done_scan2:;
          /* process for P=0, Vex=1.5V */
          for(n=1; n < num_ducers + 1; n++)
                  {
                  scan_data.l_high_zero[n] = 100.0 *(vo[n]/vr[n]);
                  scan_data.zb_high_zero[n] = 100 *((vs/vr[n])-1);
                  } if(time_to_log != 1)  /* keep P=0, return Vex to 0.8V and delay 1 sec */
          {
          data_value[0] = 0x0a3d;
          data_value[1] = 0x0000;

istat = dt_initialize (driver_name, &handle);
          istat = dt_reset (unit, handle);

istat = dt_single_acq
                          (unit, handle, DA_SECTION, data_value, &sgl);

istat = dt_terminate (handle);

vo_gain = 3;
          vo_gain_factor = 500.0;

time_val1 = time(tval1ptr);
          time_val2 = time_val1;
            while(time_val2 - time_val1 < 1)
                    time_val2 = time (tval2ptr);

for(n = 1; n < num_ducers + 1; n++)
                  {
                  scan_data.l_low_five[n] = -1.0;
                  scan_data.l_high_five[n] = -1.0;
                  }
          } /* end of if time_to_log != 1 loop */ if(time_to_log == 1)
   {
   cls();
   timeval = time(timer);
   printf("ENTERED LOGGING SEQUENCE AT: %s\n", ctime(timer));
   printf("LOGGING SEQUENCE TAKES APPROXIMATELY 1.5 MINUTES\n\n");
   printf("SETTING PRESSURE TO 5 PSIG, DELAY 60 SECONDS\n\n");
   /* set P=5, keep Vex = 1.5V, delay 60 sec and scan again */
   outp(0x229, 0x01);
   time_val1 = time(tval1ptr);
```

```c
            time_val2 = time_val1;
              while(time_val2 - time_val1 < 60)
                    time_val2 = time (tval2ptr);
            printf("SCANNING FOR 5 PSIG DATA\n\n");
            goto scan;
            done_scan3:;
            /* process for P=5, Vex=1.5V */
            for(n=1; n < num_ducers+1; n++)
                {
                scan_data.l_high_five[n] = 100.0 *(vo[n]/vr[n]);
                }

/* keep P=5, set Vex to 0.8V, delay 1 sec and scan again */ data_value[0] = 0x0a3d;
            data_value[1] = 0x0000;

istat = dt_initialize (driver_name, &handle);
            istat = dt_reset (unit, handle);

istat = dt_single_acq
                        (unit, handle, DA_SECTION, data_value, &sgl);

istat = dt_terminate (handle);

vo_gain = 3;
            vo_gain_factor = 500.0;

time_val1 = time(tval1ptr);
            time_val2 = time_val1;
              while(time_val2 - time_val1 < 1)
                    time_val2 = time (tval2ptr);

goto scan;
            done_scan4:;
            /* process for P=5, Vex=0.8 */
            for(n=1; n < num_ducers + 1; n++)
                {
                scan_data.l_low_five[n] = 100.0 *(vo[n]/vr[n]);
                }

/* return pressure to zero, set excitation to 0.8V, delay 60 sec */
            printf("5 PSIG DATA COLLECTED, RETURNING SYSTEM TO DEFAULT, DELAYING\n");
            printf("30 SECONDS AND WRITING DATA TO THE HARD DRIVE\n");
            outp(0x229, 0x00);
            time_val1 = time(tval1ptr);
            time_val2 = time_val1;
              while(time_val2 - time_val1 < 30)
                    time_val2 = time (tval2ptr);

fptr = fopen("C:\\9104ECHR.DAT" , "at");
        fprintf(fptr, "%3.2f\n", scan_data.elap_time);
        fprintf(fptr, "%2.1f\n", scan_data.temp);
```

PREPRODUCTION VERSION

JANUARY 1994

```
        for(n = 1; n < num_ducers + 1; n++)
          {
          fprintf(fptr, "%li,%3.3f,%3.3f,", scan_data.sn[n], scan_data.l_low_zero[n],
scan_data.l_low_five[n]);
          fprintf(fptr, "%3.3f,%3.3f,", scan_data.l_high_zero[n], scan_data.l_high_five[n]);
          fprintf(fptr, "%4.1f,%4.1f\n", scan_data.zb_low_zero[n], scan_data.zb_high_zero[n]);
          } fclose(fptr);

time_to_log = 0;
         } /* end of if time_to_log = 1 loop */ time_to_scan = 0;
       } /* end of if time_to_scan = 1 loop */ timeval = time(timer);

/* **************************************************************** */
/* **************************************************************** */
/* ********************* CRT OUTPUT ***************************** */
/* **************************************************************** */
/* **************************************************************** */
/* **************************************************************** */ if(timeval - timetemp >= 15 || first_log == 1)
          {
          first_log = 0;
          cls();
          printf("System time and date: %s", ctime(timer));
          printf("\n");
          printf("\tTest initiated: %s", ctime(tstartptr));
          printf("\n");
          printf("Time Elapsed: %4.2f (min)", (float)(timeval-time_start)/60);
          printf("\n");
          printf("Chamber Temperature: %3.2f (C) \n", scan_data.temp);
          printf("\n");
/*
  For the first version software, we will dump all transducer data to the CRT. It is noted that if enough units are being tested, the header information will scroll off the screen. The intention is to address this in a subsequent version.

*/ for(i=1;i < num_ducers + 1; i++)
```

```
        {
            printf("%li\t%3.3f\t%3.3f\t%3.3f\t%3.3f\t%4.1f\t%4.1f\n",
            scan_data.sn[i], scan_data.l_low_zero[i], scan_data.l_low_five[i],
            scan_data.l_high_zero[i], scan_data.l_high_five[i],
            scan_data.zb_low_zero[i], scan_data.zb_high_zero[i]);
        }
        timetemp = timeval;
    } /* end of if time_temp - time val || first_log = 1 loop */

/* **************************************************************** */
/* **************************************************************** */
/* **************************************************************** */
/* **************************************************************** */
/* **************************************************************** */
/* **************************************************************** */

} /* end of while loop */ running = 0;
goto bail_out;

/*********************************************************************/
/********************* scanning routine *****************************/
/*********************************************************************/
/*
    This routine averages the temperature voltage data (4 - 20 mA through a 47.5 Ohm resistor represents 0 to 100 degrees C) five times and computes the temperature. Following this, 20 voltage readings are averaged for the transducer output and series resistor voltage.

The output from this routine is the temperature and arrays for the output and resistor voltage averages.

Initially, due to the various excitation levels, these will not be monitored. The verifier will include excitation test and cycle pressure to test manifold operatation.
*/
/*********************************************************************/
/*********************************************************************/ scan:;

istat = dt_initialize (driver_name, &handle);
            istat = dt_reset (unit, handle);
            istat = dt_set_board (unit, handle, brd_struct);
```

```
ave_temp_voltage = 0.0;
ave_vs = 0.0;
ave_vo = 0.0;
ave_vr = 0.0;
ave_vs = 0.0;

for(i = 0; i < num_ducers + 1; i++)
  {
  if(i == 0 && scan_counter == 0)
    {
    temp_gain = 1;
    temp_channel = 0;
    temp_gain_factor = 10.0;

for(m = 0; m < 5; m++)
          {
          istat = dt_read_727_channel
                  (unit, handle, temp_channel, temp_gain, &temp_data);
          temp_voltage = (float) temp_data;
          temp_voltage = (0.30518509/1000)*temp_voltage;
          temp_voltage = temp_voltage/temp_gain_factor;
          ave_temp_voltage = ave_temp_voltage + temp_voltage;
          }
    ave_temp_voltage = ave_temp_voltage/5.0;
    temperature = (100.0/0.76)*ave_temp_voltage - ((100/0.76)*0.19);
    vo[i] = 0.0;
    vr[i] = -1.0;

} /* end of if i == 0 */ if(i == 1)
    {
    for(m = 0; m < 5; m++)
        { istat = dt_read_727_channel
                (unit, handle, vs_channel, vs_gain, &vs_data);
        vs_voltage = (float) vs_data;
        vs_voltage = (0.30518509/1000.0)*vs_voltage;
        vs_voltage = vs_voltage/vs_gain_factor;
        ave_vs = ave_vs + vs_voltage;
        }
        ave_vs = ave_vs/5.0;
        vs = ave_vs;
  } if( i > 0)
    {
    vo_channel = (i + 32);
    vr_channel = vo_channel + 31;

for(m = 0; m < 50; m++)
      {
```

```
            istat = dt_read_727_channel(unit, handle, vo_channel, vo_gain, &vo_data);

istat = dt_read_727_channel(unit, handle, vr_channel, vr_gain, &vr_data);

vo_voltage = (float) vo_data;
            vo_voltage = (0.30518509/1000.0) * vo_voltage;
            vo_voltage = vo_voltage/vo_gain_factor;
            ave_vo = ave_vo + vo_voltage;

vr_voltage = (float) vr_data;
            vr_voltage = (0.30518509/1000.0)*vr_voltage;
            vr_voltage = vr_voltage/vr_gain_factor;
            ave_vr = ave_vr + vr_voltage;

}
        ave_vo = ave_vo/50.0;
        ave_vr = ave_vr/50.0;

vo[i] = ave_vo;
        vr[i] = ave_vr;

} /* end of if i > 0 */

} /* this is where we go to the next i */ istat = dt_terminate (handle);

scan_counter = scan_counter + 1;
if(scan_counter == 1)
        goto done_scan1;
if(scan_counter == 2)
        goto done_scan2;
if(scan_counter == 3)
        goto done_scan3;
if(scan_counter == 4)
        goto done_scan4;
/*******************************************************************/
/*******************************************************************/
/*******************************************************************/ bail_out:;
} void cls(void)
{
        for(q = 0; q < 26; q++)
          printf("\n");
}
```

```
/*******************************************************************

PROGRAM EV.C

VERSION 1.0

This is a to test the hardware and timing of the 9104 enhanced measurement system.

Mux 0 channel 0 is dedicated to 4 - 20 mA temperature measurement.

Mux 0 channels 1 - 31 are dedicated to PS-9000 4 - 20 mA measurement.

Mux 1 channel 0 (32) is deedicated to 9102/9104 excitation measurement.

Mux 1 channels 1 - 31 (33 - 63) are for differential outputs.

Mux 2 channels 0 - 30 (64 - 94) are for 9104 series resistors.

Mux 2 channel 31 (95) is unused. This is due to the fact that channel 0 is used to measure excitation voltage and there is no corresponding series resistor. Mux 1 channel 1 (33) corresponds to mux 2 channel 0 (64)

and so on. This gives an n+31 relationship for channels.

The DT2817 is configured as follows:

CONTROL REGISTER:    228H

PORT 0:              229H

PORT 1:              22AH

PORT 2:              22BH

PORT 3:              22CH

Port 0 will be configured for output and the remeining ports will be configured for input to reduce hardware damage risk.

*******************************************************************/ include <stdio.h>
include <time.h>
#include <string.h>
include <math.h>
#include <float.h>
```

PREPRODUCTION VERSION

```
char      *driver_name = "DT283X$0";
int        unit      = 0;
int        i;
int       *iptr;
int        istat;
int        handle;
int        DA_SECTION;
long       data_value[2];      /* DAC output values*/
int        data, vo_data, vr_data;   /* ADC input values */
int        channel, vs_channel, vo_channel, vr_channel;
int        vs_gain_factor, vo_gain_factor, vr_gain_factor;

long       timeval, time_val1, time_val2;
long       *tval1ptr, *tval2ptr;

long       *timer;        /* timer points to timeval */
long       time_start;

float      vs_gain, vo_gain, vr_gain;
float      vs[50], vo[50], vr[50], l[50];
float      ave_vs, ave_vo, ave_vr, ave_l;
float      sdev_vs, sdev_vo, sdev_vr, sdev_l;
char       c, d;
char       junk;

struct dude
{
int   sing_chan;
int   sing_gain;
int   sing_dacs;
} sgl;

struct mike
{
        int   num_units;
        int   board_id;
        int   base_address;
        char  driver_version[10];
        int   dma_channel_1;
        int   dma_channel_2;
        int   interrupt_level;
        int   board_timeout;
        int   mux_id;
        int   ad_setup_bits;
        int   da_setup_bits;
        int   ad_sect_range;
        int   da_sect_range0;
        int   da_sect_range1;
        int   chan_onbrd;
        int   chan_offbrd;
        int   thrsh;
        int   cgl_config;
} brd_struct;
```

PREPRODUCTION VERSION

JANUARY 1994

```c
void cls(void);

main()
{ iptr = &i;
timer = &timeval;
tval1ptr = &time_val1;
tval2ptr = &time_val2;

cls();

brd_struct.num_units = 1;
            brd_struct.board_id = 0;
            brd_struct.base_address = 0;
            strcpy( brd_struct.driver_version, "RMM.VVxxx" );
            brd_struct.dma_channel_1 = 0;
            brd_struct.dma_channel_2 = 0;
            brd_struct.interrupt_level = 10;
            brd_struct.board_timeout = 60;
            brd_struct.mux_id = 0;
            brd_struct.ad_setup_bits = 0x7000;
            brd_struct.da_setup_bits = 0x0303;
            brd_struct.ad_sect_range = 0;
            brd_struct.da_sect_range0 = 0;
            brd_struct.da_sect_range1 = 0;
            brd_struct.chan_onbrd = 0;
            brd_struct.chan_offbrd = 0;
            brd_struct.thrsh = 0;
            brd_struct.cgl_config = 0;

/* set pressure to zero, DAC outputs to 0.8 Volts and greet technician */ outp(0x228, 0x01);
            outp(0x229, 0x00);

istat = dt_initialize (driver_name, &handle);
            istat = dt_reset (unit, handle);

sgl.sing_chan = 0;
            sgl.sing_gain = 0;
            sgl.sing_dacs = 3;
            DA_SECTION = 1;
            data_value[0] = 0x0a3d;
            data_value[1] = 0x0000;

istat = dt_single_acq
                        (unit, handle, DA_SECTION, data_value, &sgl);

dt_terminate (handle);

timeval = time(timer);
```

```c
        cls();
        printf("\n");
        printf("\n");
        printf("PS-9104(5) ENHANCED MEASUREMENT SYSTEM TEST PROGRAM\n");
        printf("\n");
        printf("MUX 0 CHANNEL 0 IS DEDICATED TO TEMPERATURE AND CAN BE\n");
        printf("\n");
        printf("TESTED BY SELECTING CHANNEL 0 IN THE 9000VRFY PROGRAM.\n");
        printf("\n");
        printf("THIS PROGRAM WILL TAKE 50 MEASUREMENTS FOR THE SELECTED\n");
        printf("\n");
        printf("CHANNEL AND PERFORM SEVERAL COMPUTATIONS.\n");
        printf("\n");
        printf("THE SYSTEM TIME AND DATE IS: %s", ctime(timer));
        printf("\n");
        printf("\n");
        printf("\n");

retry_cont:;

printf("Do you wish to continue ? (Y/N) \n");
        printf("\n");

c = getch();
                c = tolower(c);
                if(c == 'n')
                   goto bail_out;
                if(c != 'y')
                   goto retry_cont;

/********************************************************************/
/* NOTE: vo_gain and vo_gain_factor are modified if 1.5 V is selected */
/********************************************************************/ vs_gain_factor = 0;
        vo_gain_factor = 3;
        vr_gain_factor = 2;

vs_gain = 1.0;
        vo_gain = 500.0;
        vr_gain = 100.0;
        cls();
        printf("THE SYSTEM HAS BEEN INITIALIZED FOR AN EXCITATION VOLTAGE\n");
        printf("\n");
        printf("OF 0.8 V AND ZERO PRESSURE APPLIED TO THE MANIFOLD.\n");

retry_bonehead:;
        printf("\n");
        printf("DO YOU WISH TO CHANGE THESE SETTINGS (Y,N) ?");

c = getch();
                printf("\n");
                c = tolower(c);
```

```
                if(c == 'n')
                    goto retry_channel; /* use existing label */
                if(c != 'y')
                    goto retry_bonehead;
flag1:;
        printf("\n");
        printf("ENTER EXCITATION LEVEL: A = 0.8 V, B = 1.5 V");
                c = getch();
                c = tolower(c);
                if(c == 'b')
                  {
                  cls();
                  vo_gain_factor = 2;
                  vo_gain = 100.0;
                  printf("\n\n\n\n\n");
                  printf("SETTING EXCITATION TO 1.5 V\n");
                  istat = dt_initialize (driver_name, &handle);
                  istat = dt_reset (unit, handle);
                  data_value[0] = 0x1333;
                  data_value[1] = 0x0000;

istat = dt_single_acq
                            (unit, handle, DA_SECTION, data_value, &sgl);
                  dt_terminate (handle);
                  c = 'a';
                  }
                if(c != 'a')
                    goto flag1;
flag2:;

printf("\n");
        printf("ENTER DESIRED PRESSURE: A = 0 PSIG, B = 5 PSIG");
                c = getch();
                c = tolower(c);
                if(c == 'b')
                  {
                  outp(0x229, 0x01);
                  cls();
                  printf("SETTING PRESSURE TO 5 PSIG AND DELAYING 30 SECONDS\n");
                  printf("\n");
                  printf("WAIT BRIEFLY");
                  printf("\n\n\n\n\n");
                  time_val1 = time(tval1ptr);
                  time_val2 = time_val1;
                  while(time_val2 - time_val1 < 30)
                      time_val2 = time(tval2ptr);
                  c = 'a';
                  }
                if(c != 'a')
                    goto flag2;

retry_channel:;
        cls();
        printf("ENTER CHANNEL NUMBER (0 - 31).\n");
```

```
        scanf("%d", &channel);
        if(channel < 0 || channel > 31)
            {
            printf("YOU MAY ONLY SELECT 0 - 31\n\n\n\n");
            goto retry_channel;
            } vs_channel = channel + 32;
        vo_channel = channel + 32;
        vr_channel = channel + 63;
/*
```

Gain and gain factors set above excitation/pressure change options to allow for required changes based on excitation level. It is noted that we could also maximixe resolution in the offset measurement if we set the gain according to pressure as well. This will not be done at this time.

```
*/ ave_vs = 0.0;
        ave_vo = 0.0;
        ave_vr = 0.0;
        ave_l = 0.0;

sdev_vs = 0.0;
        sdev_vo = 0.0;
        sdev_vr = 0.0;
        sdev_l = 0.0;

printf("PRESS ANY KEY TO BEGIN THE BURST.\n");
        printf("\n");
        printf("\n");
        printf("\n");
        printf("\n");
        junk = getch();

istat = dt_initialize (driver_name, &handle);
            istat = dt_reset (unit, handle);
            istat = dt_set_board (unit, handle, brd_struct);

if(channel == 0)
    {
        for(i = 0; i < 50 ; i++)
            {
            istat = dt_read_727_channel(unit, handle, vs_channel, vs_gain_factor, &data);
            vs[i] = (float) data;
            vs[i] = (0.30518509/1000) * vs[i];
            vs[i] = vs[i]/vs_gain;
            ave_vs = ave_vs + vs[i];
            }
```

```
            ave_vs = ave_vs/50.0;
        for(i = 0; i < 50 ; i++)
            sdev_vs = sdev_vs +((vs[i] - ave_vs)*(vs[i] - ave_vs));

sdev_vs = sdev_vs/50.0;
    } /* end of if(channel == 0) block */ if(channel > 0)
  {
    for(i = 0; i < 50 ; i++)
        {
        istat = dt_read_727_channel(unit, handle, vo_channel, vo_gain_factor, &vo_data);
        istat = dt_read_727_channel(unit, handle, vr_channel, vr_gain_factor, &vr_data);

vo[i] = (float) vo_data;
        vo[i] = (0.30518509/1000) * vo[i];
        vo[i] = vo[i]/vo_gain;
        ave_vo = ave_vo + vo[i];

vr[i] = (float) vr_data;
        vr[i] = (0.30518509/1000) * vr[i];
        vr[i] = vr[i]/vr_gain;
        l[i] = 100*(vo[i]/vr[i]);

ave_vr = ave_vr + vr[i];
        ave_l = ave_l + l[i];
        } ave_vo = ave_vo/50.0;
        ave_vr = ave_vr/50.0;
        ave_l = ave_l/50.0;

for(i = 0; i < 50 ; i++)
        {
        sdev_vo = sdev_vo +((vo[i] - ave_vo)*(vo[i] - ave_vo));
        sdev_vr = sdev_vr +((vr[i] - ave_vr)*(vr[i] - ave_vr));
        sdev_l = sdev_l +((l[i] - ave_l)*(l[i] - ave_l));
        }
        sdev_vo = sdev_vo/50.0;
        sdev_vr = sdev_vr/50.0;
        sdev_l = sdev_l/50.0;

sdev_vo = (float) sqrt((double) sdev_vo);
        sdev_vr = (float) sqrt((double) sdev_vr);
        sdev_l = (float) sqrt((double) sdev_l);

} /* end of if(channel > 0) block */ dt_terminate (handle);
        cls();

if(channel == 0)
```

```
        {
        printf("THE SUPPLY VOLTAGE DATA IS AS FOLLOWS:\n\n");
            for(i = 0; i < 50; i++)
                    printf("vs[%d] = %1.3f (V)\n", i, vs[i]);
        printf("Average = %1.3f (V)\n", ave_vs);
        printf("Sdev = %1.3f (V)\n", sdev_vs);
        } if(channel > 0)
        {
        printf("THE TRANSDUCER DATA IS AS FOLLOWS:\n\n");
            for(i = 0; i < 50; i++)
                    printf("vo[%d] = %3.3f (mV)\tvr[%d] = %3.3f (mV)\tl[%d] = %3.3f (Ohms)\n", i,
1000.0*vo[i], i, 1000.0*vr[i], i, l[i]);

printf("Ave vo = %3.3f (mV)\tAve vr = %3.3f (mV)\tAve l = %3.3f (Ohms)\n",
            1000.0*ave_vo, 1000.0*ave_vr, ave_l);

printf("Sdev vo = %1.3f (mV)\tSdev vr = %1.3f (mV)\tSdev l = %1.3f (Ohms)\n",
            1000.0*sdev_vo, 1000.0*sdev_vr, sdev_l);
        }

/* set pressure to zero, DAC outputs to 0.8 Volts */ outp(0x229, 0x00);

istat = dt_initialize (driver_name, &handle);
        istat = dt_reset (unit, handle);

sgl.sing_chan = 0;
        sgl.sing_gain = 0;
        sgl.sing_dacs = 3;
        DA_SECTION = 1;
        data_value[0] = 0x0a3d;
        data_value[1] = 0x0000;

istat = dt_single_acq
                    (unit, handle, DA_SECTION, data_value, &sgl);

dt_terminate (handle);

bail_out:;
} void cls(void)
{
        for(i = 0; i < 26; i++)
            printf("\n");
}
```

What is claimed is:

1. A pressure sensor, comprising:

a piezoresistive diaphragm having four resistors connected in a bridge configuration, four connection junctions positioned on the bridge, one junction being located between each of the four resistors;

a first resistor connected in series with the bridge at a first one of said four junctions, said first resistor having a first resistance; and wherein an excitation signal is received at the bridge configuration at the first junction via the first resistor to induce a diaphragm response across opposing second and fourth junctions of said four junctions, the excitation signal having a first voltage; and wherein a second voltage occurs across the first resistor and a third voltage occurs across said second and fourth junctions of the bridge configuration in response to the excitation signal; and processing means for executing a first computer program comprising the steps:

calculating a current normalized voltage across the bridge configuration from the second voltage, third voltage and first resistance;

calculating bridge impedance from the first voltage, second voltage and first resistance;

deriving a first-pass estimate of diaphragm temperature based on the calculated bridge impedance;

deriving a first-pass estimate of pressure exerted on the diaphragm from the current normalized voltage and the first-pass temperature estimate;

correcting for temperature-induced errors in the calculated bridge impedance by using the first-pass pressure estimate to derive a corrected bridge impedance;

adjusting the first-pass temperature estimate by using the corrected bridge impedance to derive a corrected estimate of diaphragm temperature;

calculating a temperature offset error and a span error occurring in the diaphragm response;

adjusting the current normalized voltage based on the calculated temperature offset error and span error to generate a corrected current normalized voltage; and converting the corrected current normalized voltage to a corrected pressure measurement.

2. The pressure sensor of claim 1, further comprising memory for storing calibration parameters used during execution of said first computer program.

3. The pressure sensor of claim 2, in which the calibration parameters comprise non-linear temperature offset error function parameters and non-linear span error function parameters.

4. The pressure sensor of claim 2, in which the step of calculating a temperature offset error comprises execution of a temperature offset error function represented as:

$$\beta_{el}(T) = b_2 T^2 + b_1 T + b_0$$

where T is the corrected temperature estimate and $b_0$, $b_1$, and $b_2$ are the temperature offset error function parameters.

5. The pressure sensor of claim 2, in which the step of calculating a span error comprises execution of a span error function represented as:

$$\alpha_e(T) = a_2 T^2 + a_1 T + a_0;$$

where T is the corrected temperature estimate and $a_0$, $a_1$, and $a_2$ are span error function parameters.

6. A pressure measuring apparatus, comprising:

a piezoresistive diaphragm having four resistors connected in a bridge configuration, four connection junctions positioned on the bridge, one junction being located between each of the four resistors;

a first resistor connected in series with the bridge at a first one of said four junctions, said first resistor having a first resistance;

means for generating an excitation signal input to the bridge configuration at the first junction via the first resistor, the excitation signal having a supply voltage, the excitation signal inducing a diaphragm response across opposing second and fourth junctions of said four junctions;

means for detecting the diaphragm response as a second voltage across opposing second and fourth junctions of said four junctions, said second and fourth junctions not including said first junction;

means for detecting a third voltage across the first resistor; and processing means for executing a first computer program comprising the steps:

calculating a current normalized voltage across the bridge configuration from the second voltage, third voltage and first resistance;

calculating bridge impedance from the supply voltage, third voltage and first resistance;

deriving a first-pass estimate of diaphragm temperature based on the calculated bridge impedance;

deriving a first-pass estimate of pressure exerted on the diaphragm from the current normalized voltage and the first-pass temperature estimate;

correcting for temperature-induced errors in the calculated bridge impedance by using the first-pass pressure estimate to derive a corrected bridge impedance;

adjusting the first-pass temperature estimate by using the corrected bridge impedance to derive a corrected estimate of diaphragm temperature;

calculating a temperature offset error and a span error occurring in the diaphragm response;

adjusting the current normalized voltage based on the calculated temperature offset error and span error to generate a corrected current normalized voltage; and converting the corrected current normalized voltage to a corrected pressure measurement.

7. The apparatus of claim 6, further comprising:

means for capturing the second voltage and third voltage as calibration data at a plurality of known temperature and known pressure conditions within temperature operating range and pressure operating range of the diaphragm; and processing means for executing a second computer program which generates calibration parameters, the second computer program comprising the steps:

deriving temperature offset error function parameters from the calibration data;

deriving span error function parameters from the calibration data;

deriving a multiplier parameter and an offset parameter for defining a first-pass pressure estimate function from the calibration data;

deriving corrected temperature function parameters from the calibration data; and deriving corrected pressure function parameters from the calibration data.

8. The apparatus of claim 6, further comprising memory for storing calibration parameters used during execution of said first computer program.

9. The apparatus of claim 8, in which the calibration parameters comprise non-linear temperature offset error function parameters and non-linear span error function parameters.

10. The apparatus of claim 8, in which the step of calculating a temperature offset error comprises execution of a temperature offset error function represented as:

$$\beta_{et}(T) = b_2 T^2 + b_1 T + b_0$$

where T is the corrected temperature estimate and $b_0$, $b_1$, and $b_2$ are the temperature offset error function parameters.

11. The apparatus of claim 8, in which the step of calculating a span error comprises execution of a span error function represented as:

$$\alpha_e(T) = a_2 T^2 + a_1 T + a_0;$$

where T is the corrected temperature estimate and $a_0$, $a_1$, and $a_2$ are span error function parameters.

* * * * *